United States Patent
Chiba et al.

(10) Patent No.: US 9,213,548 B2
(45) Date of Patent: Dec. 15, 2015

(54) CODE GENERATION METHOD AND INFORMATION PROCESSING APPARATUS

(71) Applicant: FUJITSU LIMITED, Kawasaki-shi (JP)

(72) Inventors: Shuichi Chiba, Numazu (JP); Takashi Arakawa, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 81 days.

(21) Appl. No.: 13/850,645

(22) Filed: Mar. 26, 2013

(65) Prior Publication Data

US 2013/0262842 A1   Oct. 3, 2013

(30) Foreign Application Priority Data

Mar. 29, 2012  (JP) ................. 2012-076511

(51) Int. Cl.
*G06F 9/45* (2006.01)
*G06F 9/30* (2006.01)

(52) U.S. Cl.
CPC ............ *G06F 9/30094* (2013.01); *G06F 8/443* (2013.01)

(58) Field of Classification Search
CPC ....... G06F 8/4442; G06F 8/443; G06F 8/445; G06F 9/30094
USPC ....................................................... 717/159
See application file for complete search history.

(56) References Cited

U.S. PATENT DOCUMENTS

| 6,018,799 A * | 1/2000 | Wallace et al. ............... 712/300 |
| 2005/0289529 A1* | 12/2005 | Almog et al. ................ 717/158 |
| 2009/0313201 A1* | 12/2009 | Huelsman et al. ............... 706/47 |

FOREIGN PATENT DOCUMENTS

| JP | 2008-503836 | 2/2008 |
| WO | WO-2006/007193 | 1/2006 |

OTHER PUBLICATIONS

Bulic et al., Fast Dependence Analysis in a Multimedia Vectorizing Compiler, 2004, 176-183.*

* cited by examiner

*Primary Examiner* — Li B Zhen
*Assistant Examiner* — Bradford Wheaton
(74) *Attorney, Agent, or Firm* — Fujitsu Patent Center

(57) ABSTRACT

An information processing apparatus generates first and second trees representing a dependency relationship among instructions from first code. The information processing apparatus then adjusts the height of the shorter one of the first and second trees by inserting pseudo instructions that do not cause any difference in data before and after operation in the shorter tree, and also shuffles the order of instructions existing at the same depth from the root, according to operation types in at least one of the first and second trees. The information processing apparatus compares the first and second trees subjected to the height adjustment and the order shuffling with each other to determine combinations of an instruction of the first tree and an instruction of the second tree.

5 Claims, 32 Drawing Sheets

DIVIDING METHOD

GROUPING METHOD

|  |  |  |  |  | 141 |
|---|---|---|---|---|---|
| (1) | LOAD | mem01 | → | R01 | |
| (2) | LOAD | mem02 | → | R02 | |
| (3) | MULT | R01 × R02 | → | R03 | |
| (4) | LOAD | mem03 | → | R04 | |
| (5) | ADD | R03 + R04 | → | R05 | |
| (6) | LOAD | mem04 | → | R06 | |
| (7) | LOAD | mem05 | → | R07 | |
| (8) | MULT | R06 × R07 | → | R08 | |
| (9) | LOAD | mem06 | → | R09 | |
| (10) | ADD | R08 + R09 | → | R10 | |
| (11) | ADD | R05 + R10 | → | R11 | |
| (12) | STORE | R11 | → | mem07 | |
| (13) | STORE | R12 | → | mem08 | |

FIG. 8

| TREE ID | BASE POINT NO. | LEVEL | INSTRUCTION NO. |
|---|---|---|---|
| 1 | 6 | 4 | 1, 2, 3, 4, 5, 6 |
| 2 | 12 | 4 | 7, 8, 9, 10, 11, 12 |
| 3 | 14 | 6 | 13, 14 |

| INSTRUCTION NAME | CODE | 142 |
|---|---|---|
| MULT | 1 | |
| DIV | 2 | |
| ADD | 3 | |
| SUB | 4 | |
| LOAD | 5 | |
| STORE | 6 | |

FIG. 21

PACK 1

EDGE 1: BASE POINT OF 6 +
BASE POINT OF 12

PACK 2

EDGE 2: BASE POINT OF 16 +
BASE POINT OF 20

PACK 3

EDGE 1: BASE POINT OF 6 +
BASE POINT OF 12

EDGE 2: BASE POINT OF 16 +
BASE POINT OF 20

FIG. 27

CODE GENERATION METHOD AND INFORMATION PROCESSING APPARATUS

CROSS-REFERENCE TO RELATED APPLICATION

This application is based upon and claims the benefit of priority of the prior Japanese Patent Application No. 2012-076511, filed on Mar. 29, 2012, the entire contents of which are incorporated herein by reference.

FIELD

The embodiments discussed herein are related to a code generation method and an information processing apparatus.

BACKGROUND

Some of the existing processors such as Central Processing Units (CPU) may perform the same type of operation on different data in parallel in response to one instruction called a Single Instruction Multiple Data (SIMD) instruction. Such processors that execute SIMD instructions are provided with registers called SIMD registers, which store different data to be processed in parallel, in combination. For example, assume that a SIMD instruction of s1+s2 is input to a processor when data A1 and A2 are stored in a SIMD register s1 and data B1 and B2 are stored in a SIMD register s2. In this case, the processor performs two addition operations, A1+B1 and A2+B2, in parallel in response to the single instruction.

One of methods for generating code including a SIMD instruction is to search a plurality of non-SIMD instructions for two or more instructions which specify the same operation type and are executable in parallel, and generate a SIMD instruction by combining the found instructions. For example, some of compliers that convert source code written in a high-level language into a machine-readable object code combine two or more instructions into a SIMD instruction while performing an optimization process. The number of instructions that are possible to be combined (parallelism) is different according to the architecture of a processor.

In this connection, there has been proposed a computer system which generates a trace dependency tree representing a dependency relationship among a plurality of instructions, searches the trace dependency tree for two or more instructions which belong to the same level and specify the same operation type, and merges the found instructions into a single SIMD instruction. Please see, for example, International Publication Pamphlet No. WO2006/007193.

When generating a SIMD instruction, instructions which do not have a dependency relationship and are executable in parallel are combined. As a method of searching for such a combination of instructions, there is a method of using a tree representing a dependency relationship among instructions, as described above. When a plurality of trees (or a plurality of partial trees belonging to one big tree) is generated by analyzing code, the generated trees are compared with each other, and a combination pattern is found by combining instructions which belong to different trees and specify the same operation type.

However, a plurality of trees generated by analyzing code may not have the same shape. Therefore, it may not be possible to find optimal combinations of instructions only by comparing instructions at the same level with each other as described above. Instructions at different levels may be possible to be combined. On the other hand, in order to find more combinations of instructions that are convertible to SIMD instructions, all combinations of instructions may be searched, irrespective of the tree structures. This searching, however, increases an amount of computation and causes efficiency loss.

SUMMARY

According to one aspect, there is provided a computer-readable storage medium storing a computer program for generating, from a first code, a specific instruction that performs a same type of operation on different data in parallel by combining two or more instructions included in the first code, and generating a second code including the specific instruction. The computer program causing a computer to perform a procedure including: generating first and second trees representing a dependency relationship among instructions from the first code; adjusting a height of a shorter tree out of the first and second trees by inserting pseudo instructions that do not cause any difference in data before and after operation, in the shorter tree, and shuffling an order of instructions existing at a same depth from a root according to operation types specified by the instructions in one or both of the first and second trees; and comparing the first and second trees subjected to the adjusting of the height and the shuffling of the order with each other to determine combinations of an instruction of the first tree and an instruction of the second tree.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 illustrates an example of intermediate code;

FIG. 18 illustrates an example of base point data;

FIG. 21 illustrates an example of conversion data;

FIG. 27 illustrates an example of pack data candidates;

DESCRIPTION OF EMBODIMENTS

Figure 1:
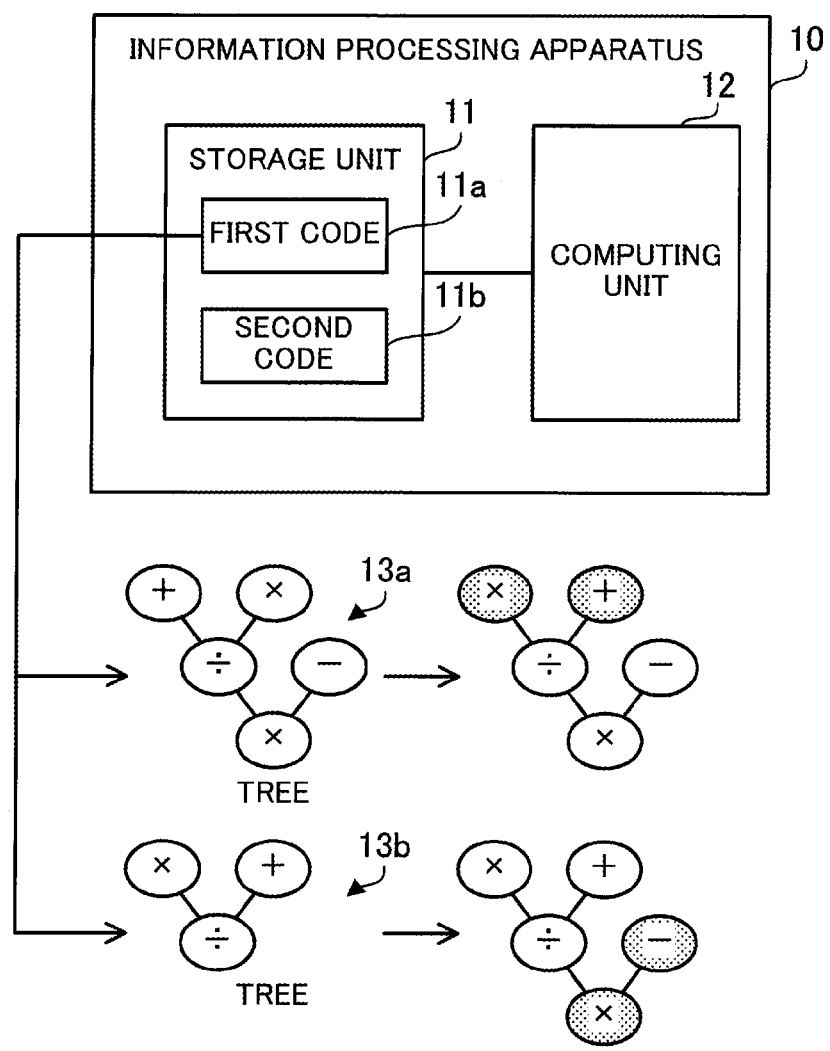
FIG. 1 illustrates an information processing apparatus according to a first embodiment.

Several embodiments will be described below with reference to the accompanying drawings, wherein like reference numerals refer to like elements throughout.

(a) First Embodiment

FIG. 1 illustrates an information processing apparatus according to a first embodiment. An information processing apparatus 10 generates second code 11b including SIMD instructions from first code 11a. The first code 11a is, for example, source code written in a high-level language or intermediate code generated by translating source code. The second code 11b is, for example, object code or execution code that a processor of the information processing apparatus 10 or another computer is able to read. The information processing apparatus 10 may be a client computer, such as a user's terminal device, or a server computer that terminal devices access. In this connection, a SIMD instruction is one example of a specific instruction for performing the same type of operation on different data in parallel.

The information processing apparatus 10 includes a storage unit 11 and a computing unit 12. The storage unit 11 stores the first code 11a and the second code 11b. The storage unit 11 may be implemented by using a volatile memory device such as a Random Access Memory (RAM), or a non-volatile storage device such as a Hard Disk Drive (HDD) or a flash memory. The computing unit 12 combines two or more instructions included in the first code 11a into a SIMD instruction, thereby generating the second code 11b. The computing unit 12 may be implemented by using a processor such as a CPU or Digital Signal Processor (DSP), or an electronic circuit other than a processor, such as an Application Specific Integrated Circuit (ASIC) or Field Programmable Gate Array (FPGA). The processor executes intended programs stored in the storage unit 11 or another memory, for example.

The computing unit 12 generates trees 13a and 13b representing a dependency relationship among the instructions included in the first code 11a. The dependency relationship includes a definition and reference relationship in which one instruction refers to data calculated by another instruction. The trees 13a and 13b are made up of different instructions. The trees 13a and 13b may be generated as subtrees of one big tree. The computing unit 12 may generate three or more trees.

Then, the computing unit 12 inserts, in the shorter one of the trees 13a and 13b, pseudo instructions that do not cause any difference in data before and after operation, thereby adjusting the height of the shorter tree. Pseudo instructions include an addition (+) which adds zero to an input value, a subtraction (−) which subtracts zero from an input value, a multiplication (×) which multiplies an input value by one, and a division (÷) that divides an input value by one. For example, in the case where the tree 13b is shorter than the tree 13a, the computing unit 12 inserts pseudo instructions in the tree 13b so that the tree 13b has the same height as the tree 13a. Pseudo instructions are inserted so that, for example, as many instructions which specify the same operation type as possible exist at the same depth (distance from the root) in the trees 13a and 13b.

In addition, the computing unit 12 shuffles the order of a plurality of instructions existing at the same depth, according to the operation types with respect to at least one of the trees 13a and 13b. For example, for each of the tree 13a and 13b, the computing unit 12 sorts the instructions existing at the same depth according to the operation types. A priority order of operations for sorting may be previously set to an order of multiplication, division, addition, and subtraction. In addition, in the case where a plurality of load instructions exists at the same depth in at least one of the trees 13a and 13b, the computing unit 12 may shuffle the order of the load instructions according to the variable names each of which identifies data to be loaded by a load instruction. For example, the computing unit 12 sorts the plurality of load instructions according to the variable names.

Then, the computing unit 12 compares the trees 13a and 13b subjected to the above-described height adjustment and order shuffling, to determine combinations of an instruction belonging to the tree 13a and an instruction belonging to the tree 13b, and generates SIMD instructions. For example, the computing unit 12 compares each instruction of the tree 13a with each of the instructions of the tree 13b existing in the same position as the instruction, and if these instructions specify the same operation type, combines the instructions into an SIMD instruction.

According to the information processing apparatus 10 of the first embodiment, the trees 13a and 13b representing a dependency relationship among instructions, which are generated from the first code 11a, are deformed so that as many instructions which specify the same operation type as possible exist in the same position. Therefore, even if the original trees 13a and 13b have different shapes, the trees 13a and 13b are deformed, and instructions existing in the same position in the deformed trees 13a and 13b are compared with each other, which makes it possible to efficiently search for combinations of instructions that are convertible to SIMD instructions.

(b) Second Embodiment

Figure 2:
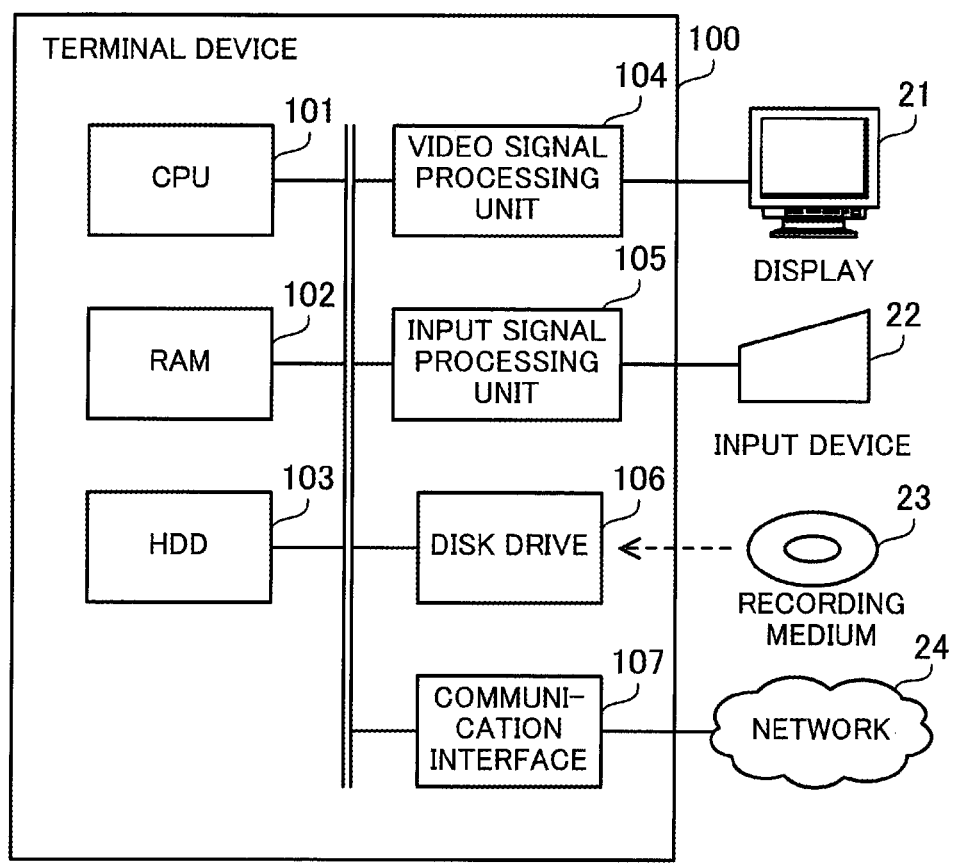
FIG. 2 is a block diagram illustrating example hardware components of a terminal device.

FIG. 2 is a block diagram illustrating example hardware components of a terminal device. The terminal device 100 of the second embodiment compiles source code written in a high-level language to generate machine-readable object code, and links a plurality of object codes to generate execution code for the terminal device 100 or another computer to execute. In this connection, these compiling and linking, which are described in the second embodiment, may be performed by using a server computer.

The terminal device 100 includes a CPU 101, RAM 102, HDD 103, video signal processing unit 104, input signal processing unit 105, disk drive 106, and communication interface 107. The CPU 101 is an example of the computing unit 12 of the first embodiment, and the RAM 102 and HDD 103 are examples of the storage unit 11 of the first embodiment.

The CPU 101 is a processor that includes a computing device to execute program instructions. The CPU 101 loads part or all of programs and data from the HDD 103 to the RAM 102, and then executes the programs. In this connection, the CPU 101 may be provided with a plurality of processor cores, and the terminal device 100 may be provided with a plurality of processors, so that processes to be described later may be performed in parallel with the plurality of processors or processor cores.

The RAM 102 is a volatile memory that temporarily stores programs and data to be used while the CPU 101 operates. In this connection, another type of memory, instead of RAM, or a plurality of memories may be provided in the terminal device 100.

The HDD 103 is a non-volatile storage device that stores software programs such as Operating System (OS), firmware, application software, etc., and data. In this connection, another type of storage device such as a flash memory or Solid State Drive (SSD), or a plurality of storage devices may be provided in the terminal device 100.

The video signal processing unit 104 outputs images to a display 21 connected to the terminal device 100 according to instructions from the CPU 101. As the display 21, a Cathode Ray Tube (CRT) display or liquid crystal display may be used.

The input signal processing unit 105 receives an input signal from an input device 22 connected to the terminal device 100, and supplies the signal to the CPU 101. As the input device 22, a pointing device such as a mouse, touch panel, etc., or a keyboard may be used.

The disk drive 106 is a driving device that reads programs and data from a recording medium 23. The recording medium 23 may be, for example, a magnetic disk such as Flexible Disk (FD), HDD, etc., an optical disc such as a Compact Disc (CD), Digital Versatile Disc (DVD), etc., or a Magneto-Optical disk (MO). The disk drive 106 loads programs and data from the recording medium 23 to the RAM 102 or HDD 103 according to instructions from the CPU 101, for example.

The communication interface 107 enables communication with other computers over a network 24. The communication interface 107 may be a wired interface connected to a wired network or a wireless interface connected to a wireless network.

Figure 3:
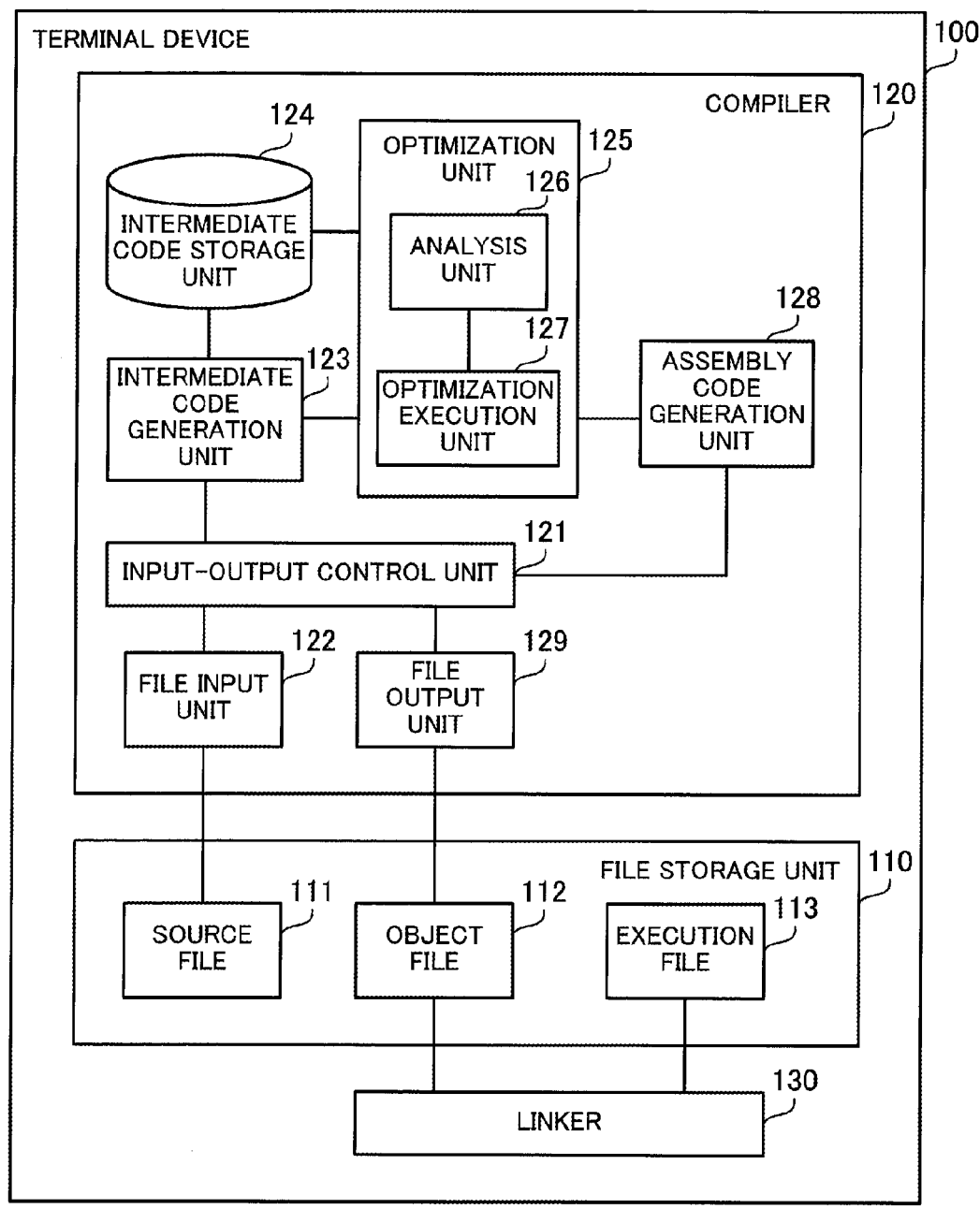
FIG. 3 is a block diagram illustrating example software components of the terminal device.

FIG. 3 is a block diagram illustrating example software components of a terminal device. The terminal device 100 includes a file storage unit 110, compiler 120, and linker 130. The file storage unit 110 is implemented by reserving a storage area of the RAM 102 or HDD 103. The compiler 120 and linker 130 are implemented as program modules that are executed by the CPU 101. In this connection, some or all of the functions of the compiler 120 and linker 130 may be implemented by using electronic circuits, not software programs.

The file storage unit 110 stores a source file 111, object file 112, and execution file 113. The source file 111 contains source code written in a high-level language. The object file 112 contains machine-readable object code including SIMD instructions. The execution file 113 is in such a format as to be executable by a processor that has a specific architecture to execute SIMD instructions. In this connection, the CPU 101 may be designed to be able to or not be able to execute the execution file 113.

The compiler 120 reads the source file 111 from the file storage unit 110, translates source code into object code, and stores the object file 112 in the file storage unit 110. The compiler 120 includes an input-output control unit 121, file input unit 122, intermediate code generation unit 123, intermediate code storage unit 124, optimization unit 125, assembly code generation unit 128, and file output unit 129.

The input-output control unit 121 selects an input-output method according to the type of a file, and controls the file input unit 122 and the file output unit 129. The file input unit 122 opens the source file 111 in response to an instruction from the input-output control unit 121, and reads source code from the source file 111. The intermediate code generation unit 123 analyzes the source code read by the file input unit 122 to translate the source code into intermediate code written in an intermediate language, which is used by the compiler 120, and stores the intermediate code in the intermediate code storage unit 124. The analysis of source code includes lexical analysis, structure analysis, semantic analysis, etc. The intermediate code storage unit 124 is a storage area reserved in the RAM 102, and stores intermediate code.

The optimization unit 125 optimizes intermediate code stored in the intermediate code storage unit 124 in order to speed up execution. The optimization unit 125 includes an analysis unit 126 and optimization execution unit 127. The analysis unit 126 analyzes intermediate code to determine an optimization method. When determining an optimization method, the analysis unit 126 also determines combinations of instructions to be converted into SIMD instructions from the instructions included in the intermediate code. The optimization execution unit 127 optimizes the intermediate code with the optimization method determined by the analysis unit 126. In the optimization, the optimization execution unit 127 also converts the instructions included in the intermediate code to SIMD instructions.

The assembly code generation unit 128 converts the optimized intermediate code into assembly code that is written in an assembly language, which is a low-level language. The file output unit 129 generates an object file 112 in response to an instruction from the input-output control unit 121. The file output unit 129 then translates the assembly code generated by the assembly code generation unit 128 to object code, and writes the object code to the object file 112.

The linker 130 reads the object file 112 from the file storage unit 110, analyzes the object code to detect other object files and libraries to be referenced. The linker 130 then links the object file 112 with the detected object files and libraries to generate the execution file 113. In this connection, the functions of the linker 130 may be provided in the compiler 120.

The following describes how to execute a SIMD instruction in a processor.

Figure 4:
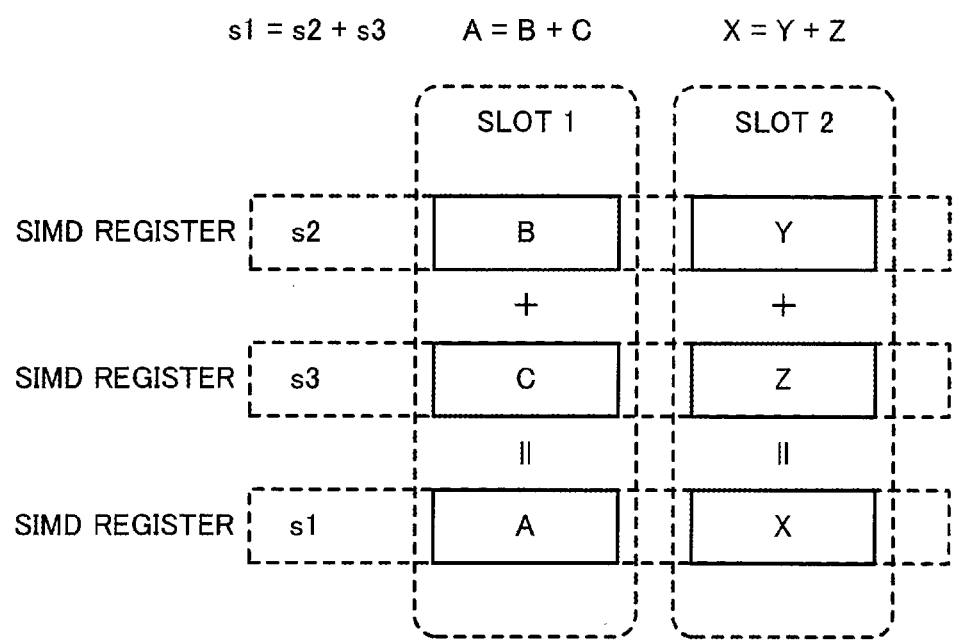
FIG. 4 illustrates an example of a relationship between a SIMD instruction and SIMD registers.

FIG. 4 illustrates an example of a relationship between a SIMD instruction and SIMD registers. A processor that is able to execute SIMD instructions includes SIMD registers that store data to be processed in parallel, in combination. Each SIMD register includes as many subregisters as the value of the parallelism that is determined according to the processor architecture. FIG. 4 illustrates the case where the parallelism is two.

For example, as illustrated in FIG. 4, consider the case of converting two instructions, A=B+C and X=Y+Z, into a single SIMD instruction, s1=s2+s3. Data B, data Y, data C, and data Z are stored in the subregister 1 of the SIMD register s2, the subregister 2 of the SIMD register s2, the subregister 1 of the SIMD register s3, and the subregister 2 of the SIMD register s3, respectively. In this case, in response to the SIMD instruction, two additions are executed in parallel to thereby calculate data A and X which is then stored in the subregisters 1 and 2 of the SIMD register s1, respectively.

In this connection, a set of subregisters located in the same position is called a slot. More specifically, each subregister 1 of the SIMD registers s1, s2, and s3 belongs to a slot 1, and each subregister 2 of the SIMD registers s1, s2, and s3 belongs to a slot 2. In a SIMD instruction, one operation is performed using a plurality of subregisters belonging to the same slot.

Figure 5A:
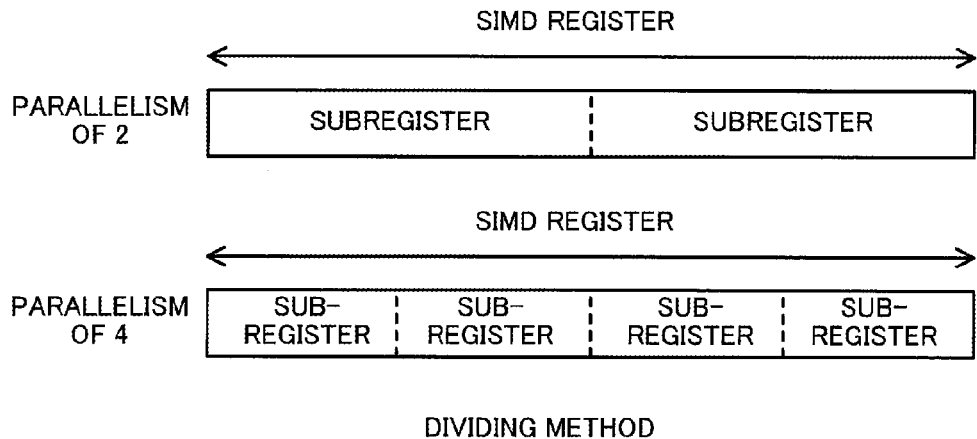
FIGS. 5A and 5B illustrate examples of implementation of SIMD registers.
Figure 5B:
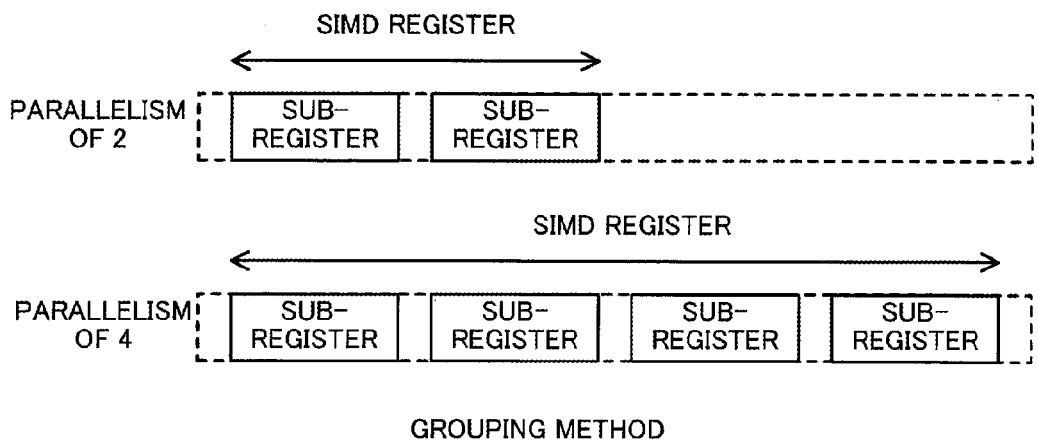

FIGS. 5A and 5B illustrate examples of implementation of SIMD registers. For implementing SIMD registers in a processor, there are a dividing method illustrated in FIG. 5A and a grouping method illustrated in FIG. 5B.

The dividing method is to logically divide one large physical register into a plurality of subregisters of the same size. In the case of a parallelism of two, the storage area of the physical register is divided into halves. In the case of a parallelism of four, the storage area of the physical register is divided into four. In the case where the size of a physical register is fixed, the greater the parallelism, the smaller the number of bits in each subregister. In this dividing method, a SIMD register refers to a physical register, and a subregister refers to a logical register.

On the other hand, in the grouping method, a SIMD register is formed by grouping and using as subregisters a plurality of physical registers with the same number of bits. In the case of a parallelism of two, a set of two physical registers is used as a SIMD register. In the case of a parallelism of four, a set of four physical registers is used as a SIMD register. In the case where physical registers of the same size are used, the greater the parallelism, the greater the number of bits in a SIMD register. In this grouping method, a SIMD register refers to a logical register, and a subregister refers to a physical register.

The following describes a problem that occurs in selecting a combination of instructions to be converted into a SIMD instruction.

Figure 6:
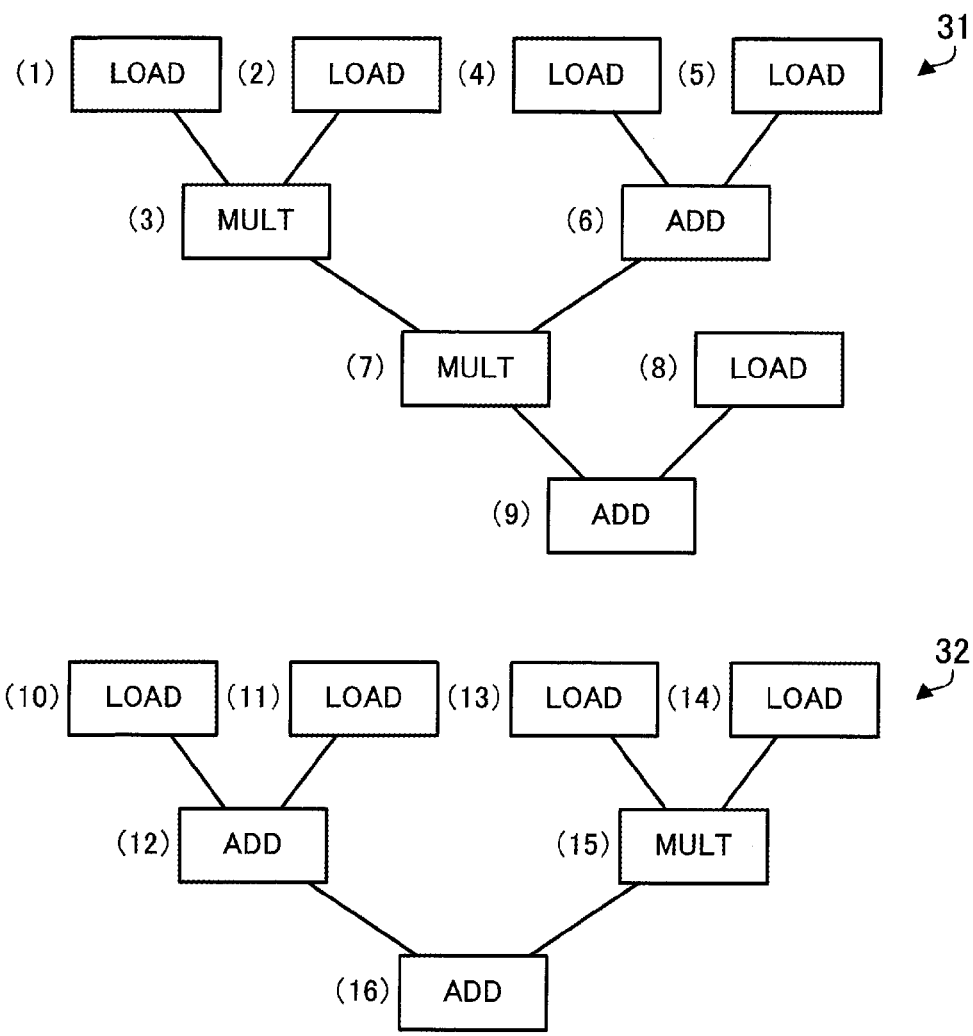
FIG. 6 illustrates an example of dependency trees.

FIG. 6 illustrates an example of dependency trees. Each dependency tree 31 and 32 represents a dependency relationship among instructions included in intermediate code. Here, consider the case where instructions 1 to 16 are included in a block of code (in a translation block) which the compiler 120 processes at a time. Each of the instructions 1, 2, 4, 5, 8, 10, 11, 13, and 14 is a LOAD instruction for loading data from a RAM to a register. Each of the instructions 3, 7, and 15 is a MULT (multiplication) instruction, and each of the instructions 6, 9, 12, and 16 is an ADD (addition) instruction.

The instruction 3 depends on the instructions 1 and 2, the instruction 6 depends on the instructions 4 and 5, the instruction 7 depends on the instructions 3 and 6, and the instruction 9 depends on the instructions 7 and 8. The instruction 12 depends on the instructions 10 and 11, the instruction 15 depends on the instructions 13 and 14, and the instruction 16 depends on the instruction 12 and 15. The instructions 1 to 9 form the dependency tree 31, whereas the instructions 10 to 16 form the dependency tree 32. That is to say, a set of the instructions 1 to 9 and a set of the instructions 10 to 16 have no dependency relationship, and therefore are executable in parallel.

For this reason, it is considered that the optimization unit 125 combines an instruction belonging to the dependency tree 31 and an instruction belonging to the dependency tree 32 into an SIMD instruction (conversion to SIMD). However, it is not easy to search for combinations of instructions that are convertible to SIMD because the dependency trees 31 and 32 have different shapes. For example, only a set of instructions 7 and 15 and a set of instructions 9 and 16 are detected by simply searching instructions at the same depth from the root nodes for combinations of instructions that are convertible to SIMD. In this case, a ratio (SIMD ratio) of instructions to be converted to SIMD to the instructions belonging to the dependency tree 31 is calculated as 2÷9=0.22 (22%).

To search combinations of instructions that are convertible to SIMD, there is considered a method of testing all different combinations of instructions appearing in a predetermined block of intermediate code. However, this method of testing all different combinations of instructions increases an amount of computation and a memory region used for the computation, and thus is inefficiency. For example, assuming that there are n instructions that specify the same operation type, there are nPn patterns of instruction combinations. In the case where n is eight, there are 40320 patterns. Therefore, a larger search block in intermediate code leads to a difficulty in searching all instruction combinations for optimal combination patterns.

To deal with this, the optimization unit 125 searches for instruction combinations with a method that is described below.

Figure 7:
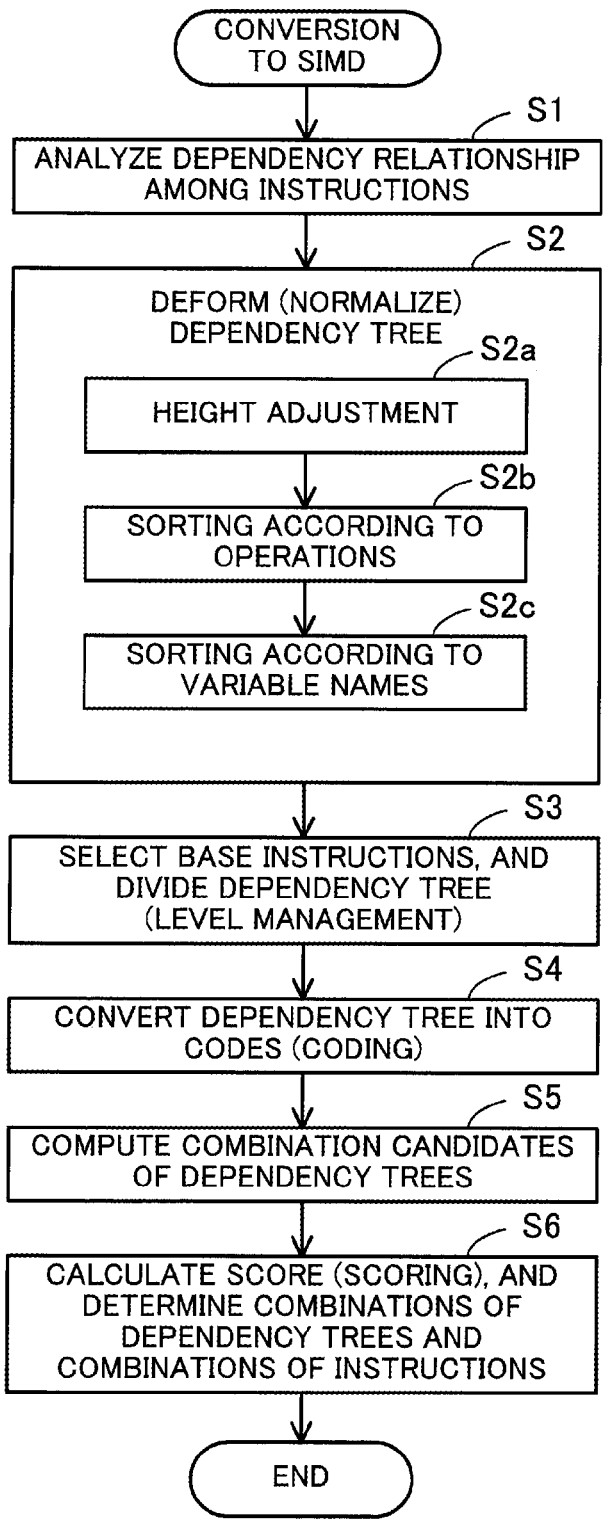
FIG. 7 is a flowchart illustrating an exemplary procedure for conversion to SIMD.

FIG. 7 illustrates a flowchart illustrating an exemplary procedure for conversion to SIMD.

At step S1, the analysis unit 126 reads intermediate code of one translation block from the intermediate code storage unit 124, and analyzes a dependency relationship among the instructions included in the read intermediate code. The analysis unit 126 then generates a plurality of dependency trees representing the dependency relationship among the instructions.

At step S2, the analysis unit 126 deforms (normalizes) at least one of the plurality of dependency trees generated at step S1 in order to make it easy to search for instruction combinations. Step S2 includes the following steps S2a, S2b, and S2c.

At step S2a, the analysis unit 126 inserts pseudo instructions in at least one of the plurality of dependency trees so that the dependency trees become the same height (height adjustment). At step S2b, the analysis unit 126 sorts instructions existing at the same depth according to the operation types in each dependency tree. At step S2c, the analysis unit 126 sorts LOAD instructions existing at the same depth according to the variable names of data to be read, in each dependency tree.

At step S3, the analysis unit 126 selects one or more instructions that are base points from a dependency tree, and divides a dependency tree by using the selected base instructions as root nodes (level management) in order to make it easy to compare dependency trees with each other. The second embodiments use STORE instructions for writing data to a RAM, as base instructions.

At step S4, the analysis unit 126 codes each dependency tree in order to compare instructions between the dependency trees efficiently. That is to say, the analysis unit 126 generates, for each dependency tree, coded data by arranging codes indicating the operation types according to the structure of the dependency tree.

At step S5, the analysis unit 126 computes all combination candidates of dependency trees. The number of dependency trees belonging to one combination is equal to the SIMD parallelism. For example, in the case of the parallelism of two, the analysis unit 126 computes all combinations each made up of two dependency trees under predetermined conditions (for example, dependency trees to be combined need to have the same height, to have no dependency relationship, etc.). In this connection, steps S4 and S5 may be performed in reverse order or in parallel.

At step S6, the analysis unit 126 calculates a score indicating the matching level of instructions by comparing the coded data generated at step S4, with respect to each combination candidate of dependency trees computed at step S5 (scoring). In this scoring, it is evaluated whether corresponding nodes among a plurality of dependency trees include instructions that perform the same type of operations. The analysis unit 126 determines combinations of dependency trees based on the calculated scores, and determines to convert the instructions of corresponding nodes in each combination of dependency trees to SIMD.

The following describes an example of how to implement the procedure illustrated in FIG. 7. A procedure for generating dependency trees by analyzing a dependency relationship among instructions from intermediate code will be first described.

FIG. 8 illustrates an example of intermediate code. Intermediate code 141 is stored in the intermediate code storage unit 124. The intermediate code 141 includes instructions 1 to 13 in one translation block. The instructions 1, 2, 4, 6, 7, and 9 are LOAD instructions. The instructions 12 and 13 are STORE instructions. The instructions 3 and 8 are MULT (multiplication) instructions, and the instructions 5, 10, and 11 are ADD (addition) instructions.

The instruction 3 refers to data loaded by the instructions 1 and 2, the instruction 8 refers to data loaded by the instructions 6 and 7, the instruction 10 refers to data calculated by the instructions 8 and 9, the instruction 11 refers to data calculated by the instructions 5 and 10, and the instruction 12 refers to data calculated by the instruction 11. The instruction 13 does not refer to any of data that is loaded or calculated by the instructions 1 to 12. In this connection, R01 to R12 in FIG. 8 represent logical registers, and mem01 to mem08 represent logical storage areas of a RAM.

Figure 9:
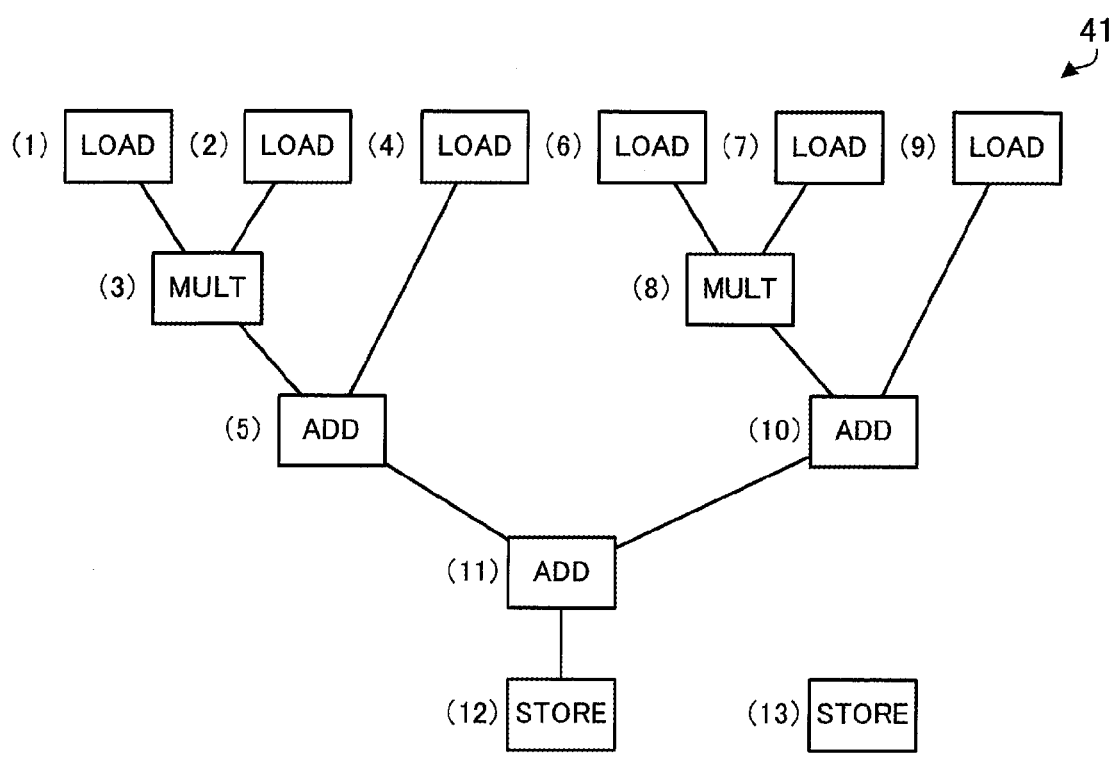
FIG. 9 illustrates another example of dependency trees.

FIG. 9 illustrates another example of dependency trees. A dependency tree 41 is generated from the instructions 1 to 12 illustrated in FIG. 8. The instruction 13 that has no dependency relationship with the instructions 1 to 12 does not belong to the dependency tree 41. When one instruction depends on another instruction in the dependency tree 41, the one instruction corresponds to a parent node, and the other instruction corresponds to a child node. The calculation is performed, starting with a leaf node of the dependency tree 41 and proceeding toward the root node. The instruction 3 depends on the instructions 1 and 2, the instruction 5 depends on the instructions 3 and 4, the instruction 8 depends on the instructions 6 and 7, the instruction 10 depends on the instructions 8 and 9, the instruction 11 depends on the instructions 5 and 10, and the instruction 12 depends on the instruction 11.

Figure 10:
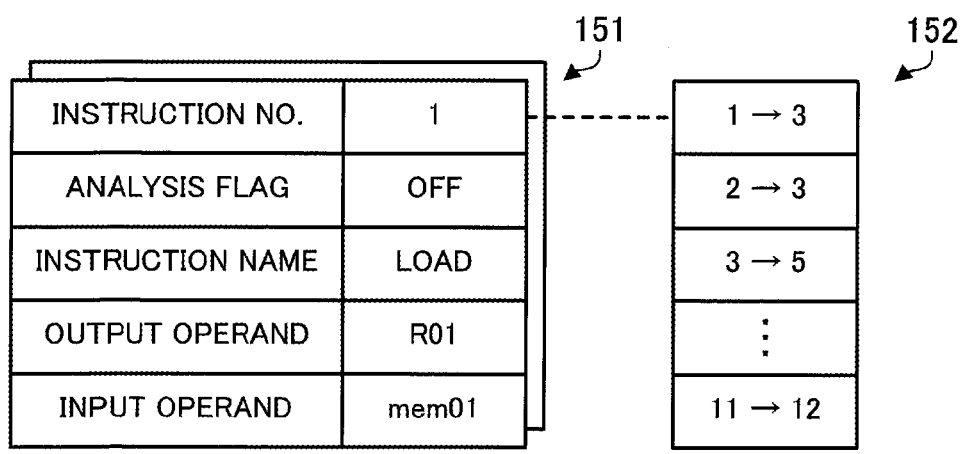
FIG. 10 illustrates an example of instruction data and dependency data.

FIG. 10 illustrates an example of instruction data and dependency data. The optimization unit 125 generates instruction data 151 and dependency data 152 by analyzing a dependency relationship.

The instruction data 151 is generated for each instruction, and includes fields for instruction number (No.), analysis flag, instruction name, output operand, and input operand. An instruction number is a number identifying an instruction. An analysis flag indicates whether the instruction has been analyzed or not, and is used in analyzing a dependency relationship, and so on. The initial value of the analysis flag is set to OFF. An instruction name is a name (ADD, SUB, MULT, DIV, LOAD, STORE, etc.) identifying an operation type. The output operand field contains an identifier of a storage area of a logical register or RAM used in the intermediate code 141, that is, the identifier of the storage area that stores data. The input operand field contains the identifiers of one or more logical registers or storage areas of the RAM that store data to be referenced.

The dependency data 152 includes one or more combinations of the instruction number of a definition instruction and the instruction number of a reference instruction. A definition instruction is an instruction in which a register or RAM area that is the output operand of the instruction is to be referenced by another instruction. A reference instruction is an instruction which refers to, as an input operand, a register or a storage area of the RAM defined as an output operand by another instruction.

Figure 11:
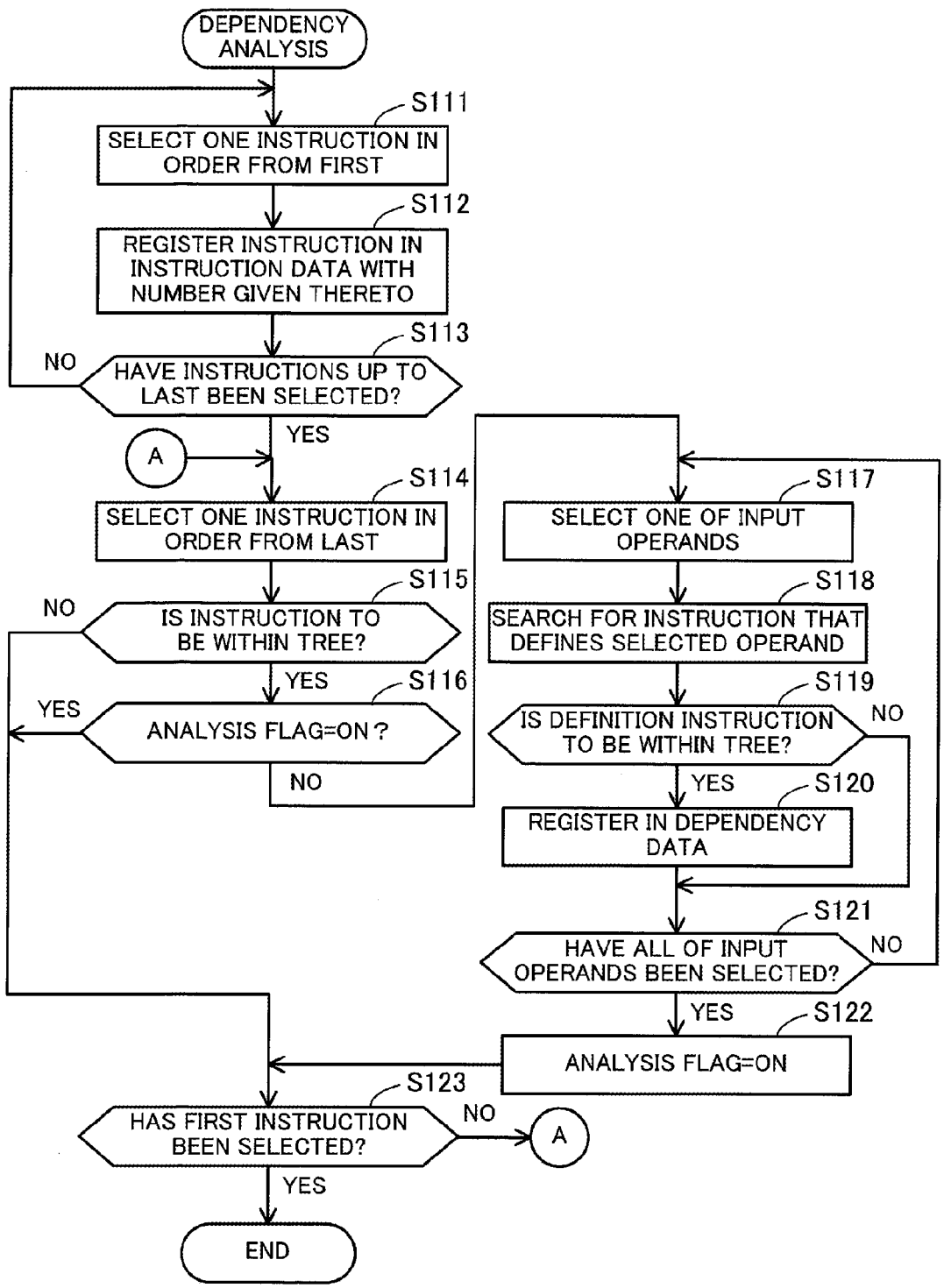
FIG. 11 is a flowchart illustrating an exemplary procedure for dependency analysis.

FIG. 11 is a flowchart illustrating an exemplary procedure for dependency analysis. The process described by the flowchart of FIG. 11 is performed at the above-described step S1.

At step S111, the analysis unit 126 selects one of instructions included in a translation block, in order from the first. At step S112, the analysis unit 126 extracts the instruction name, output operand, and input operands from the selected instruction, and registers the instruction in the instruction data 151 with an instruction number given thereto. At step S113, the analysis unit 126 determines whether all of the instructions up to the last in the translation block have been selected at step S111 or not. If all of the instructions have been selected, the process proceeds to step S114. If there is any unselected instruction, the process goes back to step S111.

At step S114, the analysis unit 126 selects one of instructions included in the translation block, in order from the last. At step S115, the analysis unit 126 determines whether to include the selected instruction in a dependency tree. If the selected instruction satisfies this condition, the process proceeds to step S116. Otherwise, the process proceeds to step S123. At step S116, the analysis unit 126 determines whether the selected instruction has an analysis flag of ON or not (has been analyzed or not). If the analysis flag is ON, the process proceeds to step S123. If the analysis flag is OFF, on the other hand, the process proceeds to step S117.

At step S117, the analysis unit 126 selects one of the input operands of the instruction selected at step S114. At step S118, the analysis unit 126 searches the instructions in the translation block for an instruction (definition instruction) that has an output operand corresponding to the selected input operand. At step S119, the analysis unit 126 determines whether the found definition instruction belongs to the dependency tree of the current translation block (for example, whether or not the found definition instruction is not included in another translation block). If the definition instruction satisfies this condition, the process proceeds to step S120. Otherwise, the process proceeds to step S121. At step S120, the analysis unit 126 registers a dependency relationship of the definition instruction found at step S119 on the instruction (reference instruction) selected at step S114, in the dependency data 152.

At step S121, the analysis unit 126 determines whether all of the input operands of the selected instruction have been selected at step S117 or not. If all of the input operands have been selected, the process proceeds to step S122. If there is any unselected input operand, the process goes back to step S117. At step S122, the analysis unit 126 sets the analysis flag of the instruction selected at step S114 to ON. At step S123, the analysis unit 126 determines whether all of the instructions up to the first in the translation block have been selected at step S114 or not. If all of the instructions have been selected, the process is completed. If there is any unselected instruction, the process goes back to step S114.

The following describes how to deform (normalize) a dependency tree.

Figure 12:
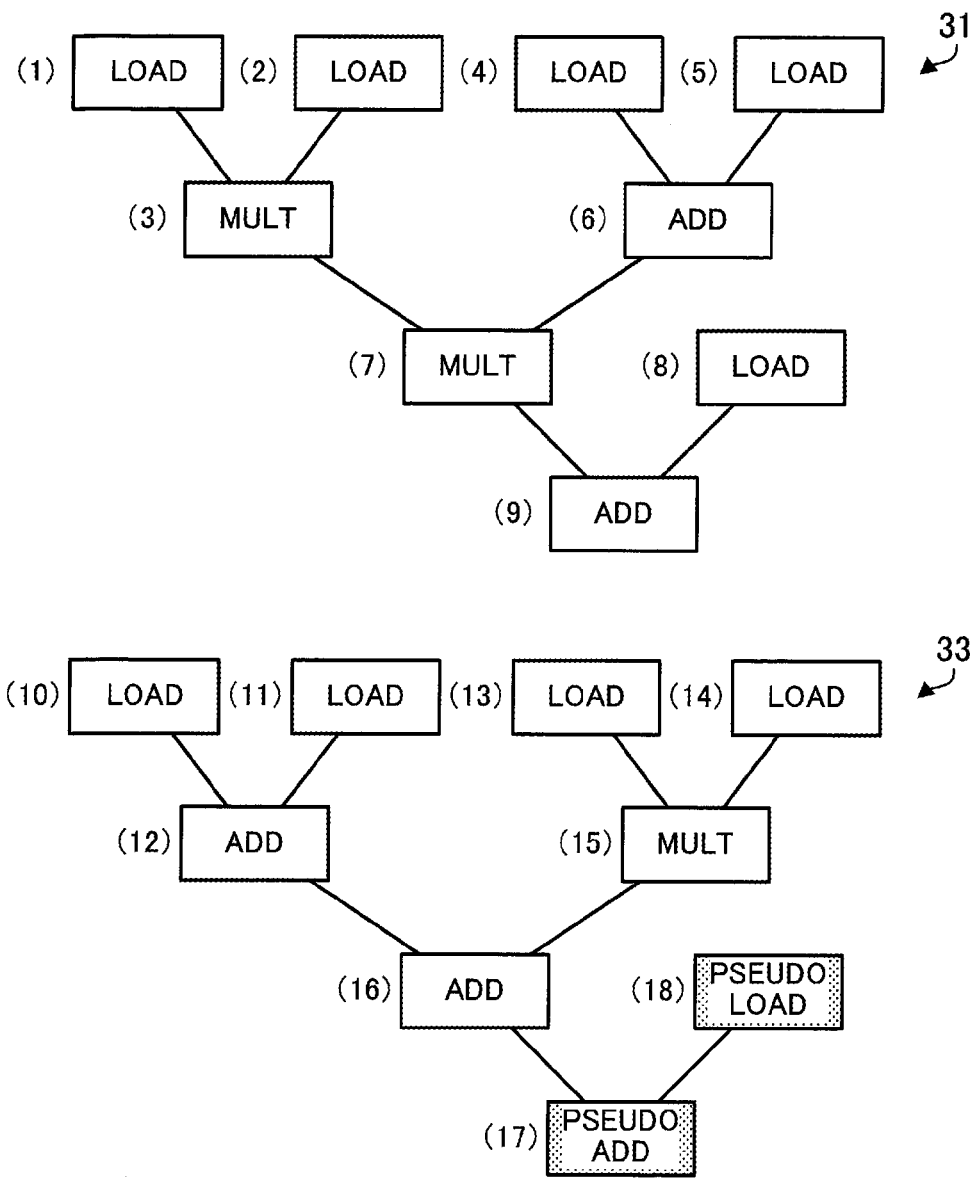
FIGS. 12 to 14 illustrate first to third examples of deformation of a dependency tree.

FIG. 12 illustrates a first example of deformation of a dependency tree. The height of the dependency tree 31 illustrated in FIG. 6 (the number of nodes from the root node up to and including the deepest leaf node) is four, whereas the height of the dependency tree 32 is three. This means that these dependency trees 31 and 32 have different heights. Therefore, the analysis unit 126 deforms the shorter dependency tree 32 into the dependency tree 33 by inserting therein pseudo instructions.

Pseudo instructions are instructions which do not cause any difference in data before and after operation. A pseudo addition (pseudo ADD) is to add zero to an input value. A pseudo subtraction (pseudo SUB) is to subtract zero from an input value. A pseudo multiplication (pseudo MULT) is to multiply an input value by one. A pseudo division (pseudo DIV) is to divide an input value by one. A pseudo LOAD is to read the same data again so as not to change register data. A pseudo STORE is to overwrite data with the same data in the RAM so as not to change the data.

The dependency tree 33 is generated by inserting instructions 17 and 18 in the dependency tree 32 including the instructions 10 to 16. The instruction 17 is a pseudo ADD instruction inserted so as to correspond to the instruction 9 of the dependency tree 31. The instruction 18 is a pseudo LOAD instruction inserted so as to correspond to the instruction 8 of the dependency tree 31. The instruction 17 depends on the instructions 16 and 18. Insertion of the instructions 17 and 18 makes the dependency tree 33 have the same height as the dependency tree 31. In this way, the analysis unit 126 inserts pseudo instructions in the dependency tree 32 so that the dependency tree 32 has the same height as the dependency tree 31, and as many instructions which specify the same operation type as possible exist at the same depth.

Figure 13:
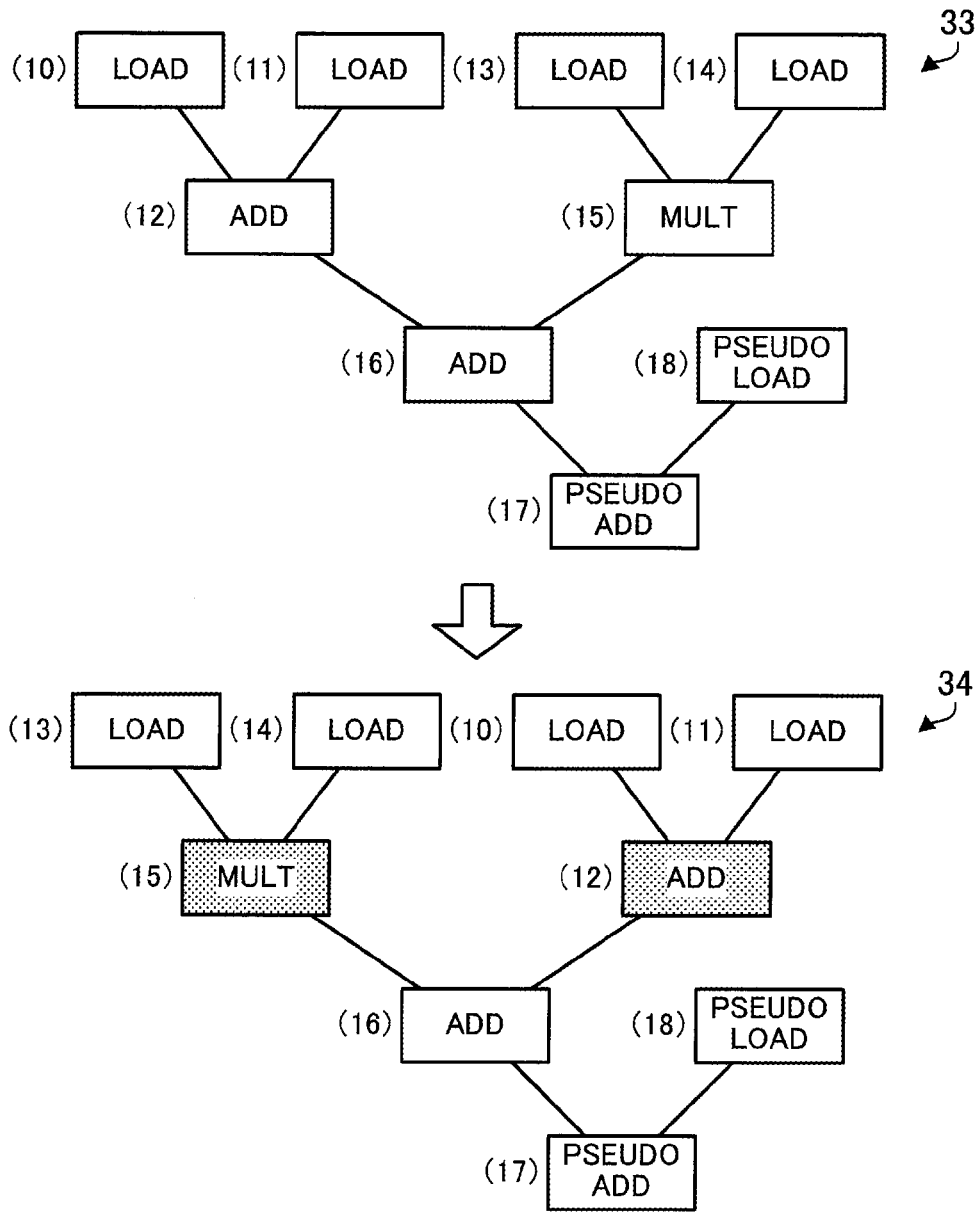

FIG. 13 illustrates a second example of deformation of a dependency tree. The analysis unit 126 sorts instructions whose order is able to be shuffled, according to the operations types so as to increase a probability in which instructions that specify the same operation type exist in corresponding positions of the dependency trees 31 and 33. The order of operations is shuffled in each of the dependency trees 31 and 33. FIG. 13 illustrates an example of deforming the dependency tree 33 into the dependency tree 34 by shuffling the order of operations.

Figure 14:
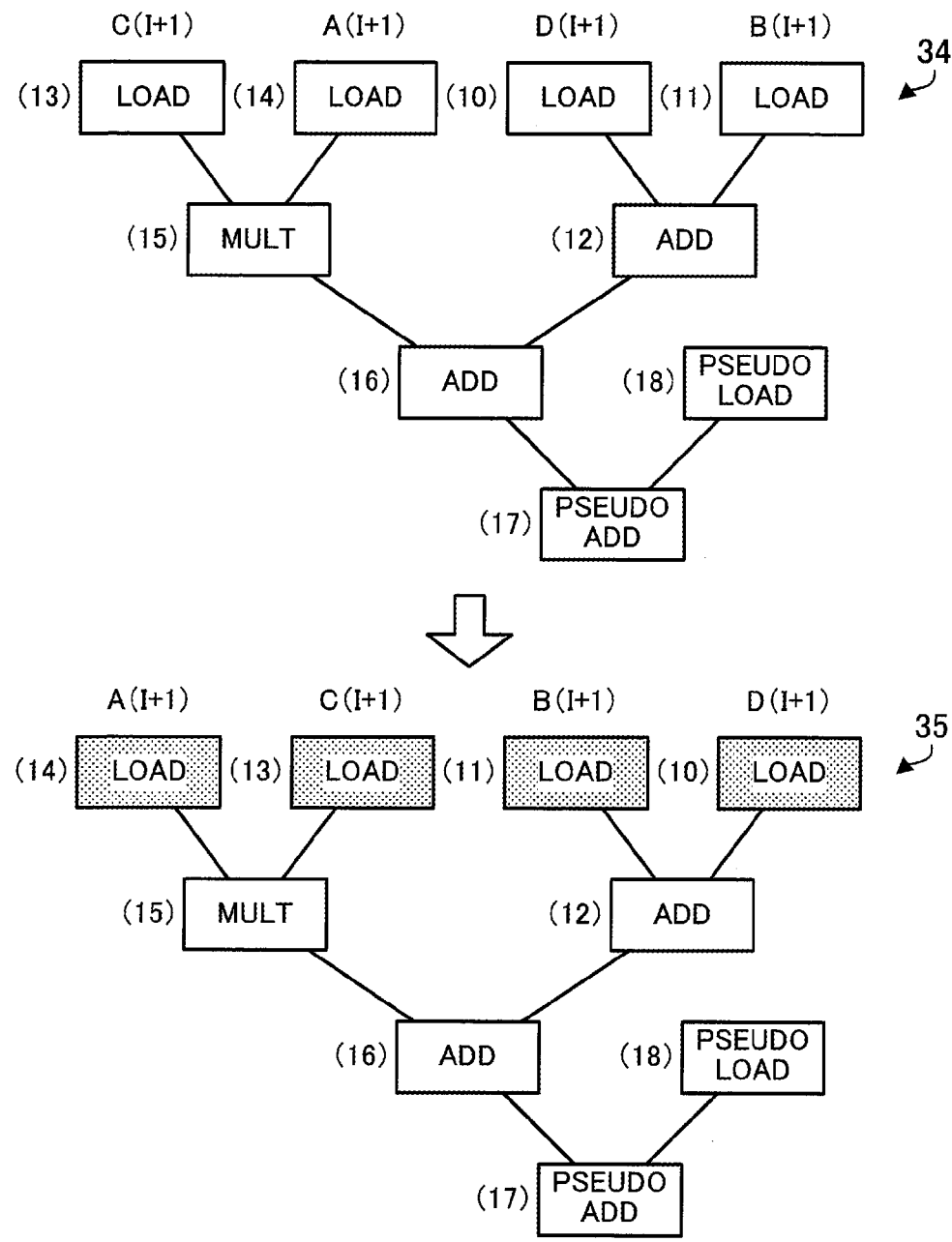

To sort instructions, the analysis unit 126 previously determines a priority order of operations. For example, with respect to the four arithmetic operations, a priority order is set to an order of multiplication (MULTI), division (DIV), addition (ADD), and division (DIV). In this case, instructions 12 and 15 both having a dependency relationship with the same instruction (instruction 16) are detected as a combination of instructions that are replaceable with each other, and the instruction 15 that is a MULT instruction is arranged on the left side of the instruction 12 that is an ADD instruction in the tree, according to the priority order of operations. On the other hand, in the case of employing the above priority order of operations, the dependency tree 31 does not need to be deformed. FIG. 14 illustrates a third example of deformation of a dependency tree. When converting a combination of LOAD instructions to SIMD, the analysis unit 126 sorts the LOAD instructions according to variable names so that LOAD instructions to be combined access storage areas of the RAM as close to each other as possible. Variable names are replaced with each other in each of the dependency trees 31 and 34. FIG. 14 illustrates an example of deforming the dependency tree 34 into the dependency tree 35 by replacing variable names with each other.

For example, assuming that the instructions 10, 11, 13, and 14 are to load data D(I+1), B(I+1), C(I+1), and A(I+1), respectively, the instructions 10 and 11 both having a dependency relationship with the same instruction (instruction 12) are detected as a combination of LOAD instructions that are replaceable with each other, and according to the variable names, the instruction 11 is arranged on the left side of the instruction 10 in the tree. In addition, the instructions 13 and 14 both having a dependency relationship with the same instruction (instruction 15) are detected as a combination of LOAD instructions that are replaceable with each other, and according to the variable names, the instruction 14 is arranged on the left side of the instruction 13 in the tree. A lexicographic order is used as a priority order of variable names, for example. Information of the variable names is included in the intermediate code stored in the intermediate code storage unit 124.

In this connection, referring to FIG. 13, the instruction number of an instruction is moved together with the contents of the instruction. However, in the internal processing of the analysis unit 126, only the contents of instructions are replaced with each other, but the instruction numbers thereof may not be replaced as described later. Therefore, for example, the instruction with the instruction number of 12 may be changed from an ADD instruction to a MULT instruction. Similarly, referring to FIG. 14, the instruction number of an instruction is moved together with the variable name of data to be loaded. However, in the internal processing of the analysis unit 126, only variable names are replaced with each other, but the instruction numbers may not be replaced. Therefore, for example, the variable name of data to be loaded by an instruction with the instruction number of 13 may be changed from C(I+1) to A(I+1). In addition, either the shuffling of the order of operations described with reference to FIG. 13 or the replacement of variable names described with reference to FIG. 14 may be performed first.

Figure 15:
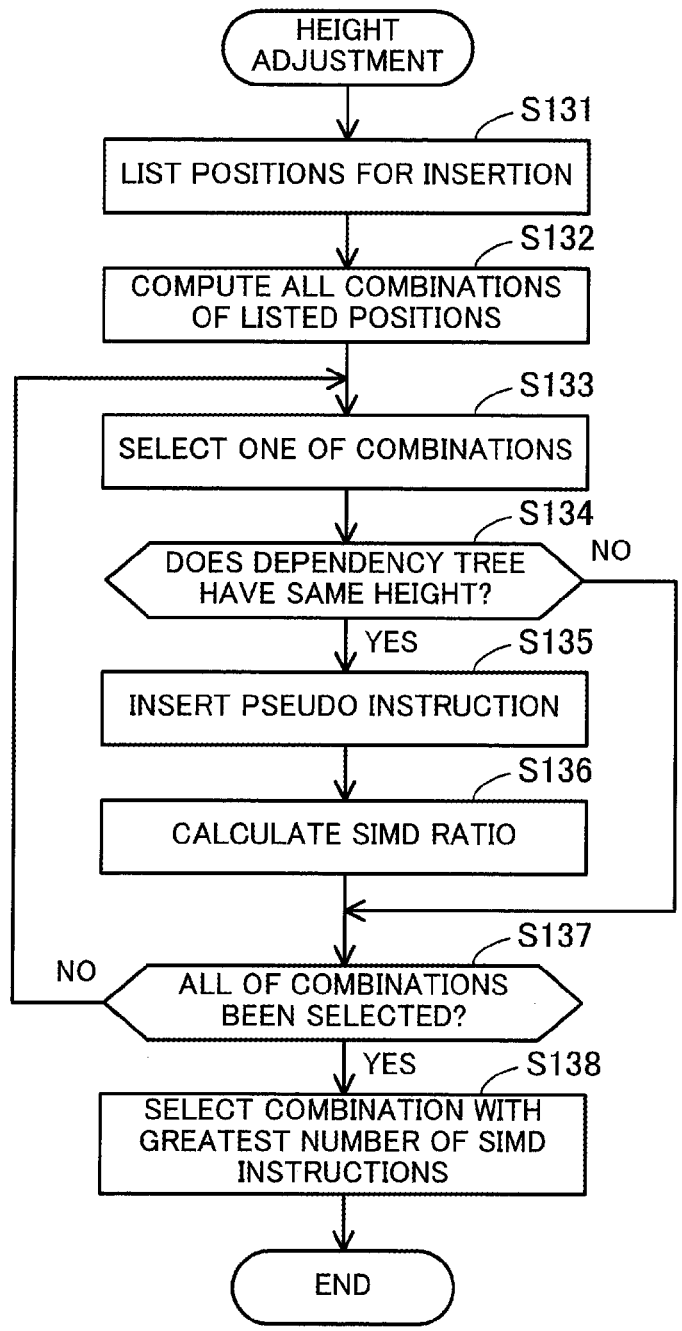
FIG. 15 is a flowchart illustrating an exemplary procedure for height adjustment.

FIG. 15 is a flowchart illustrating an exemplary procedure for height adjustment. The process described by the flowchart of FIG. 15 is performed at the above-described step S2. This process is performed for each of a plurality of dependency trees excepting the highest dependency tree.

At step S131, the analysis unit 126 lists positions where pseudo instructions are insertable in a dependency tree. For example, in the case of the dependency tree 32, seven positions that are positions one higher than the nodes corresponding to the respective instructions 10 to 16 (in a direction in which the depth becomes smaller) are selected. At step S132, the analysis unit 126 computes the power set of positions listed at step S131 (all combination patterns of positions). For example, in the case where seven positions are listed, all combination patterns, an empty set Φ, {position 1}, {positions 1, 2}, {positions 1, 2, 3}, . . . , {position 6}, {positions 6, 7}, and {position 7}, are computed.

At step S133, the analysis unit 126 selects one of the combinations of positions computed at step S132. At step S134, the analysis unit 126 determines whether or not the dependency tree, when deformed by inserting a pseudo instruction in each position of the selected combination, has the same height as the other dependency trees to be compared with the dependency tree. If the dependency tree has the same height, the process proceeds to step S135. Otherwise, the process proceeds to step S137.

At step S135, the analysis unit 126 inserts a pseudo instruction in each position of the combination selected at step S133. At this time, the analysis unit 126 selects an operation type for the pseudo instruction so that as many instructions which specify the same operation type as possible exist at the same depth in the dependency tree in which the pseudo instruction is to be inserted and the other dependency trees to be compared with the dependency tree. At step S136, the analysis unit 126 compares instructions existing at the same depth among the dependency tree having the pseudo instructions inserted therein and the other dependency trees to detect combinations of instructions that are convertible to SIMD, and calculates a SIMD ratio of the dependency tree having the pseudo instructions inserted therein (may calculate the number of instructions to be converted to SIMD (the number of SIMD instructions)).

At step S137, the analysis unit 126 determines whether all of the combinations have been selected at step S133 or not. If all of the combinations have been selected, the process proceeds to step S138. If there is any unselected combination, the analysis unit 126 cancels the insertion of the pseudo instructions to restore the original dependency tree, and then the process goes back to step S133. At step S138, the analysis unit 126 determines a combination of positions with the greatest SIMD ratio (or the greatest number of SIMD instructions) calculated at step S136, and inserts the pseudo instructions in the dependency tree according to the determined combination.

Figure 16:
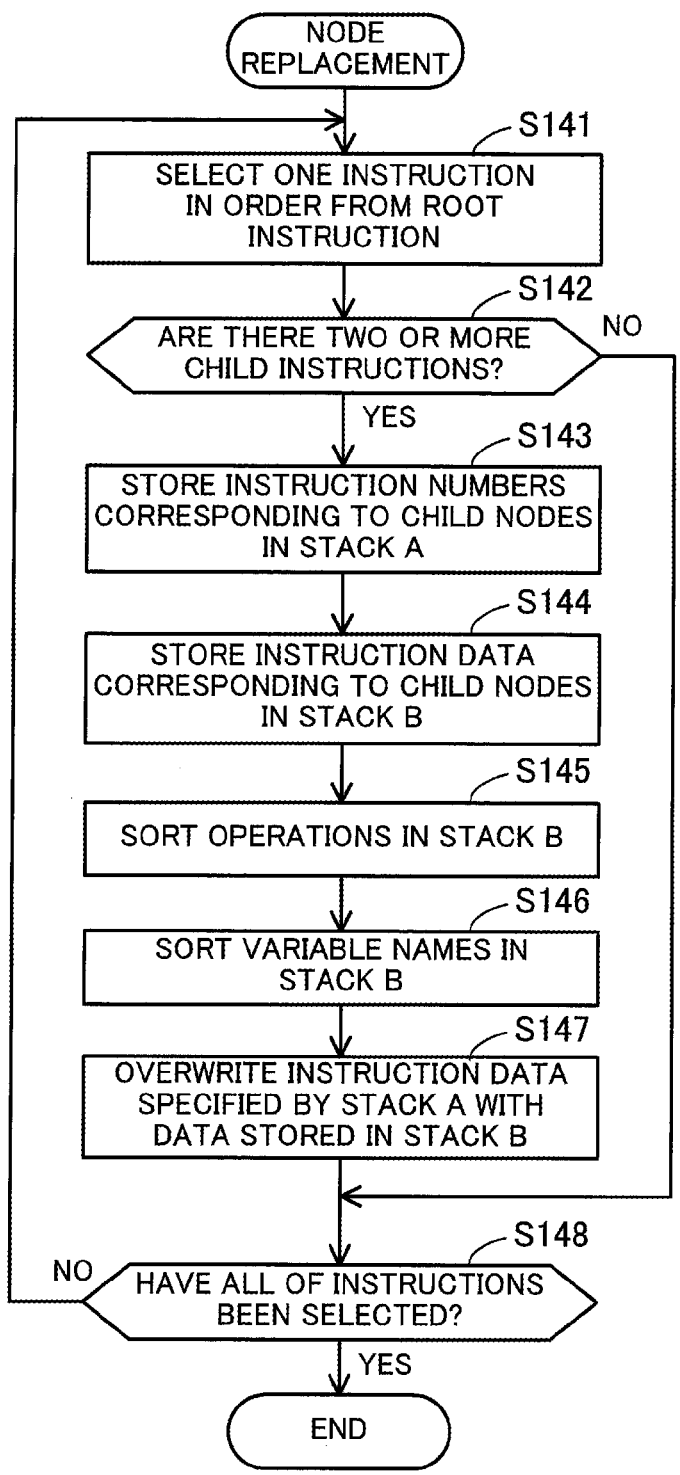
FIG. 16 is a flowchart illustrating an exemplary procedure for node replacement.

FIG. 16 is a flowchart illustrating an exemplary procedure for node replacement. The process described by the flowchart of FIG. 16 is performed at the above-described step S2, and is performed for each dependency tree after the process described by the flowchart of FIG. 15 is performed.

At step S141, the analysis unit 126 selects one instruction from the dependency tree, in order from the last of the intermediate code 141 (instruction corresponding to the root node). At step S142, the analysis unit 126 determines whether or not there are two or more instructions that are child nodes of the selected instruction in the dependency tree. If there are two or more instructions, the process proceeds to step S143. Otherwise, the process proceeds to step S148.

At step S143, the analysis unit 126 stores the instruction numbers of the instructions corresponding to the child nodes, in order from the most left nodes in the dependency tree, in the stack A that is a storage area reserved in the RAM 102. At step S144, the analysis unit 126 stores the data of the instructions corresponding to the child nodes in the order that corresponds to the instruction numbers, in a stack B that is another storage area reserved in the RAM 102. For example, in the case where the instruction 16 of the dependency tree 33 is selected at step S141, the instruction numbers 12 and 15 are stored in the stack A, and the data of the instructions 12 and 15 is stored in the stack B.

At step S145, the analysis unit 126 sorts the data of the instructions according to the instruction names of the instructions in the stack B. For example, if the data is stored in the stack B in the order of the instructions 12 and 15, the data is replaced in the order of the instructions 15 and 12. At step S146, in the case where the data of two or more LOAD instructions is stored in the stack B, the analysis unit 126 confirms the variable name corresponding to each LOAD instruction with reference to the intermediate code 141, and then sorts the data of the LOAD instructions according to the variable names in the stack B.

At step S147, the analysis unit 126 overwrites the instruction data 151 specified by the instruction numbers stored in the stack A with the data of the instructions stored in the stack B. Since the instruction numbers in the stack A are arranged in the same order as before the sorting, a correspondence between instruction numbers and instruction contents is updated. For example, the instruction data specified by the instruction number of 12 is overwritten with the data of the instruction 15, and the instruction data specified by the instruction number of 15 is overwritten with the data of the instruction 12. At step S148, the analysis unit 126 determines whether all of the instructions have been selected at step S141 or not. If all of the instructions have been selected, the process is completed. If there is any unselected instruction, the process goes back to step S141.

The following describes how to select base instructions and how to divide a dependency tree (level management).

Figure 17:
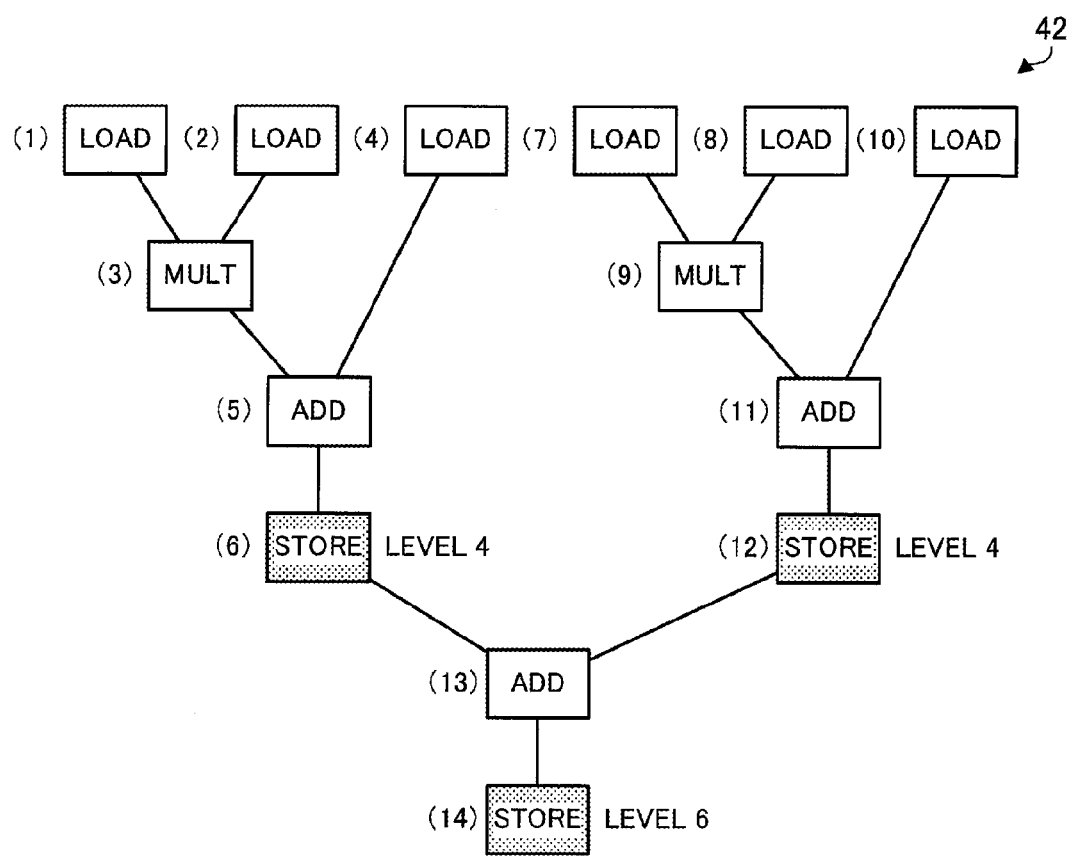
FIG. 17 illustrates an example of dividing a dependency tree.

FIG. 17 illustrates an example of dividing a dependency tree. This example describes the case where the dependency tree 42 including the instructions 1 to 14 is generated as illustrated in FIG. 17. The instructions 3 and 9 are MULT instructions, and the instructions 5, 11, and 13 are ADD instructions. The instructions 1, 2, 4, 7, 8, and 10 are LOAD instructions, and the instructions 6, 12, 14 are STORE instructions. The instruction 3 depends on the instructions 1 and 2, the instruction 5 depends on the instructions 3 and 4, and the instruction 6 depends on the instruction 5. The instruction 9 depends on the instructions 7 and 8, the instruction 11 depends on the instructions 9 and 10, and the instruction 12 depends on the instruction 11. The instruction 13 depends on the instruction 6 and 12, and the instruction 14 depends on the instruction 13.

In this second embodiment, this dependency tree 42 is divided into three small dependency trees with the STORE instructions 6, 12, and 14 as base points, in order to make it easy to compare dependency trees with each other. More specifically, the analysis unit 126 divides the dependency tree 42 into a dependency tree having the instruction 6 as a base instruction (root instruction) and made up of the instructions 1 to 6, a dependency tree having the instruction 12 as a base instruction and made up of the instructions 7 to 12, and a dependency tree having the instruction 14 as a base instruction and made up of the instructions 13 and 14.

At this time, the analysis unit 126 calculates the level of each base instruction. The level of a base instruction indicates how many nodes exist in the longest one of paths connecting between the node of the base instruction and the respective leaf nodes subordinate to the node of the base instruction in the original dependency tree 42. For example, the level of the instruction 6 is four because four nodes exist in a path connecting the instruction 6 and the instruction 1 (or instruction 2). The level of the instruction 12 is four because four nodes exist in a path connecting the instruction 12 and the instruction 7 (or instruction 8). The level of the instruction 14 is six because six nodes exist in a path connecting the instruction 14 and the instruction 1 (or instruction 2, 7, or 8).

FIG. 18 illustrates an example of base point data. After selecting base instructions and dividing the dependency tree 42, the analysis unit 126 generates base point data 153. The base point data 153 includes fields for tree identifier (ID), base point number, level, and instruction number, for each divided dependency tree. A tree identifier identifies a divided dependency tree. A base point number is the instruction number of a base instruction. A level is the level of the base instruction that is calculated as described above. The instruction number field lists the instruction numbers of instructions included in the divided dependency tree.

Figure 19:
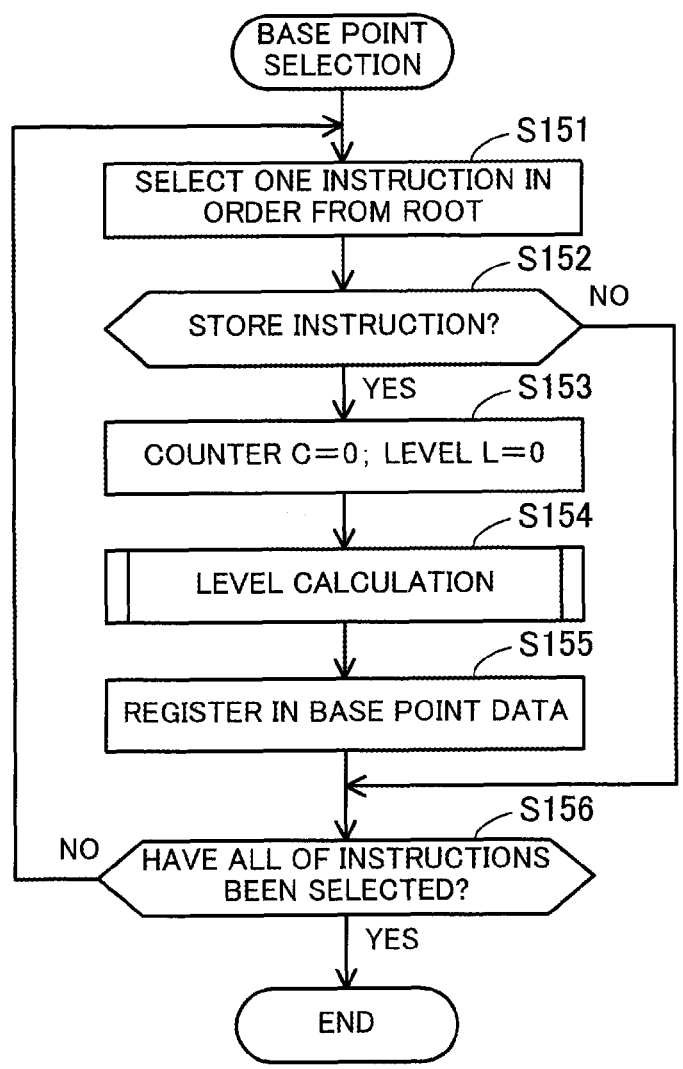
FIG. 19 is a flowchart illustrating an exemplary procedure for selecting base points.

FIG. 19 is a flowchart illustrating an exemplary procedure for selecting base points. The process described by the flowchart of FIG. 19 is performed for each dependency tree at the above-described step S3.

At step S151, the analysis unit 126 selects one of the instructions included in a dependency tree, in order from the instruction corresponding to the root node. At step S152, the analysis unit 126 determines whether the selected instruction is a STORE instruction or not. If the instruction is a STORE instruction, the analysis unit 126 determines the instruction as a base instruction, and the process proceeds to step S153.

Otherwise, the process proceeds to step S156 without determining the instruction as a base instruction.

At step S153, the analysis unit 126 initializes a counter C to zero and a level L to zero. At step S154, the analysis unit 126 calculates the level of the base instruction with a subroutine which will be described later. At step S155, the analysis unit 126 registers information on a dependency tree having the determined base instruction as a root node, in the base point data 153. At step S156, the analysis unit 126 determines whether all of the instructions have been selected at step S151 or not. If all of the instructions have been selected, the process is completed. If there is any unselected instruction, the process goes back to step S151.

Figure 20:
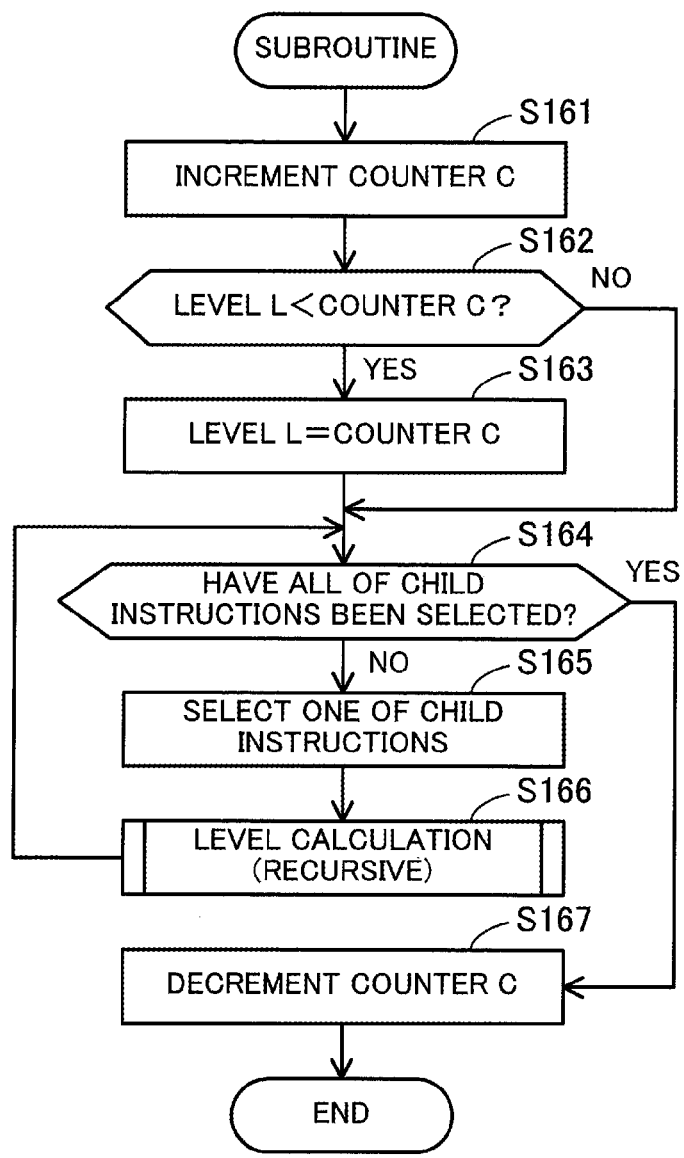
FIG. 20 is a flowchart illustrating an exemplary procedure of a subroutine for level calculation.

FIG. 20 is a flowchart illustrating an exemplary procedure of a subroutine for level calculation. This subroutine illustrated in FIG. 20 receives a counter C and level L as parameters. This subroutine is called at the above-described step S154.

At step S161, the analysis unit 126 increments the counter C (add one to the value). At step S162, the analysis unit 126 determines whether the current value of the level L is smaller than the value of the counter C or not. If the value of the level L is smaller than the value of the counter C, the process proceeds to step S163. Otherwise, the process proceeds to step S164. At step S163, the analysis unit 126 substitutes the value of the counter C for the level L.

At step S164, the analysis unit 126 determines whether all of the instructions corresponding to the child nodes of the instruction in question have been selected at the following step S165 or not. If all of the instructions have been selected, the process proceeds to step S167. If there is any unselected instruction, the process proceeds to step S165. At step S165, the analysis unit 126 selects one of the instructions corresponding to the child nodes. At step S166, the analysis unit 126 gives the current level L and counter C as parameters with respect to the instruction corresponding to the child node selected at step S165 to recursively call the subroutine of FIG. 20. Then, the process proceeds to step S164. At step S167, the analysis unit 126 decrements the counter C (subtract one from the value).

The following describes coding of a dependency tree.

FIG. 21 illustrates an example of conversion data. Conversion data 142 indicates a correspondence between an operation type and a code. The analysis unit 126 converts each instruction included in a dependency tree into a code with reference to the conversion data 142. Referring to the example of FIG. 21, a MULT instruction, DIV instruction, ADD instruction, SUB instruction, LOAD instruction, and STORE instruction are converted into "1", "2", "3", "4", "5", and "6", respectively.

Figure 22:
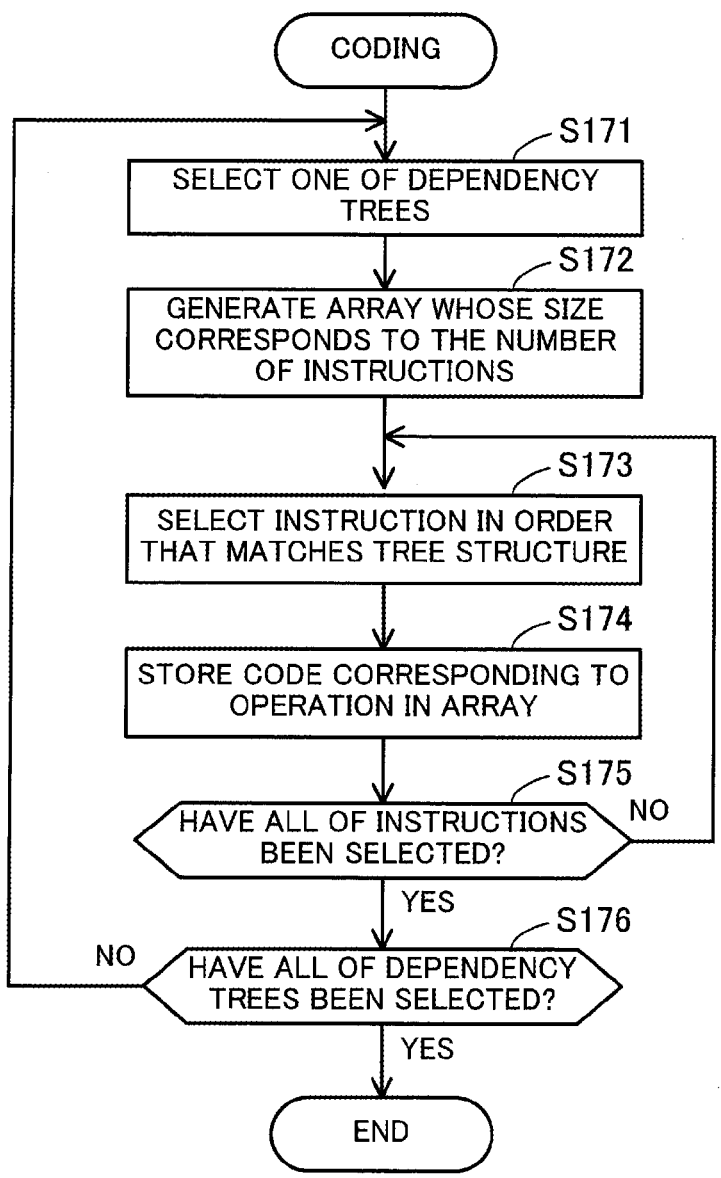
FIG. 22 is a flowchart illustrating an exemplary procedure for coding.

FIG. 22 is a flowchart illustrating an exemplary procedure for coding. The process described by the flowchart of FIG. 22 is performed at the above-described step S4.

At step S171, the analysis unit 126 selects one dependency tree with reference to the base point data 153. At step S172, the analysis unit 126 generates, as coded data, an array whose size corresponds to the number of instructions included in the selected dependency tree.

At step S173, the analysis unit 126 selects one instruction from the dependency tree selected at step S171, in the order that matches the tree structure. For example, the analysis unit 126 selects an instruction from the dependency tree with a backtracking depth-first search. In the case of the dependency tree having the instruction 6 as a base point illustrated in FIG. 17, the instruction is selected in the order of instructions 1, 2, 3, 4, 5, and 6.

At step S174, the analysis unit 126 searches the conversion data 142 for a code corresponding to the operation type specified by the selected instruction, and stores the found code in the array. When an i-th instruction is selected at step S173, the code corresponding to the i-th instruction is stored in the i-th position in the array. For example, in the case of the dependency tree having the instruction 6 as a base point illustrated in FIG. 17, a code array of 5, 5, 1, 5, 3, and 6 is generated as coded data corresponding to this dependency tree.

At step S175, the analysis unit 126 determines whether all of the instructions have been selected at step S173 or not. If all of the instructions have been selected, the process proceeds to step S176. If there is any unselected instruction, the process goes back to step S173. At step S176, the analysis unit 126 determines whether all of the dependency trees have been selected at step S171 or not. If all of the dependency trees have been selected, the process is completed. If there is any unselected dependency tree, the process goes back to step S171.

The following describes how to compute combination candidates of dependency trees and to determine combinations of dependency trees.

Figure 23:
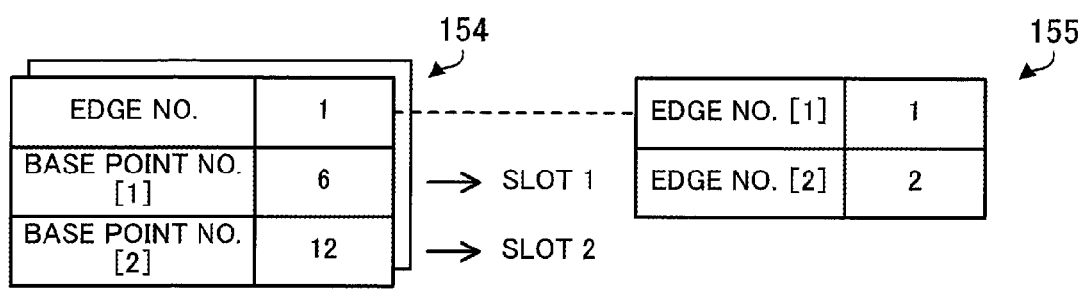
FIG. 23 illustrates an example of edge data and pack data.

FIG. 23 illustrates an example of edge data and pack data. The analysis unit 126 computes combination candidates of dependency trees, and generates edge data 154. The analysis unit 126 also determines combinations of dependency trees, and generates pack data 155.

The edge data 154 is generated for each combination of dependency trees, and includes fields for edge number and two or more base point numbers. An edge number is a number identifying an edge (combination of dependency trees). The field for a base point number [S] (S=1, 2, . . . ) contains the instruction number of a base instruction of a dependency tree. The number of base point numbers corresponds to the SIMD parallelism. In conversion to SIMD, an S-th slot is allocated to the instructions of a dependency tree corresponding to the base point number [S]. That is, a slot 1 is allocated to the instructions of the dependency tree corresponding to the base point number [1], and a slot 2 is allocated to the instructions of the dependency tree corresponding to the base point number [2].

The pack data 155 indicates a set (pack) of one or more combinations of dependency trees to be employed for generating SIMD instructions, out of the combinations of dependency trees registered in the edge data 154. The pack data 155 includes fields for one or more edge numbers. The edge data 154 and the pack data 155 are associated with each other by an edge number.

Figure 24:
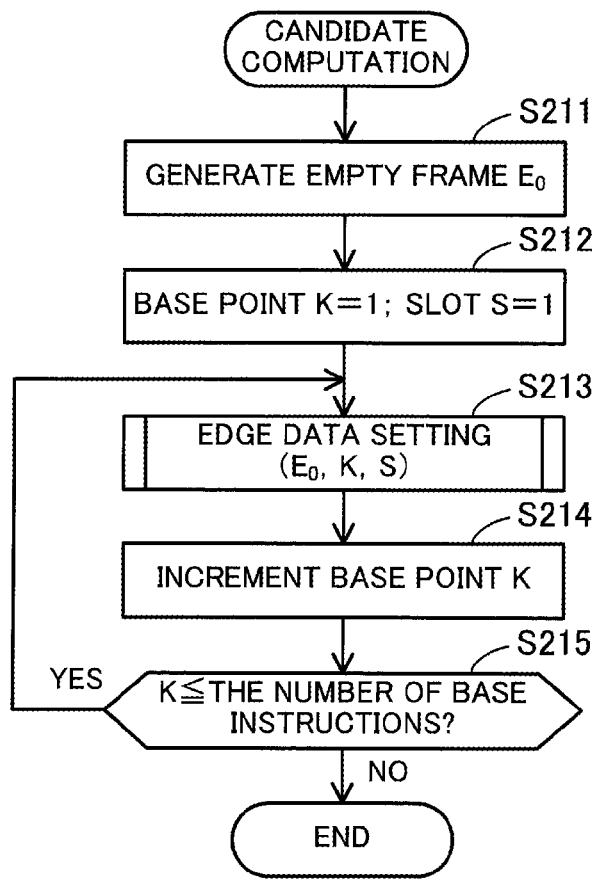
FIG. 24 is a flowchart illustrating an example procedure for computing candidates.

FIG. 24 is a flowchart illustrating an exemplary procedure for computing candidates. The process described by this flowchart of FIG. 24 is performed at the above-described step S5.

At step S211, the analysis unit 126 generates an empty frame $E_0$ for storing one-edge data. The number of base point number fields included in the frame $E_0$ corresponds to the SIMD parallelism. At step S212, the analysis unit 126 defines a base point K and slot S as variables, and initializes the base point K to one and the slot S to one.

At step S213, the analysis unit 126 sets base point numbers to the frame $E_0$ and a copy frame of the frame $E_0$, with a subroutine which will be described later. At this time, the analysis unit 126 gives the frame $E_0$, base point K, and slot S as parameters to the subroutine. At step S214, the analysis unit 126 increments the base point K (add one to the value). At step S215, the analysis unit 126 determines whether or not the value of the base point K is smaller than or equal to the total number of base instructions (the total number of generated dependency trees). If this condition is satisfied, the process proceeds to step S213. Otherwise, the process is completed.

Figure 25:
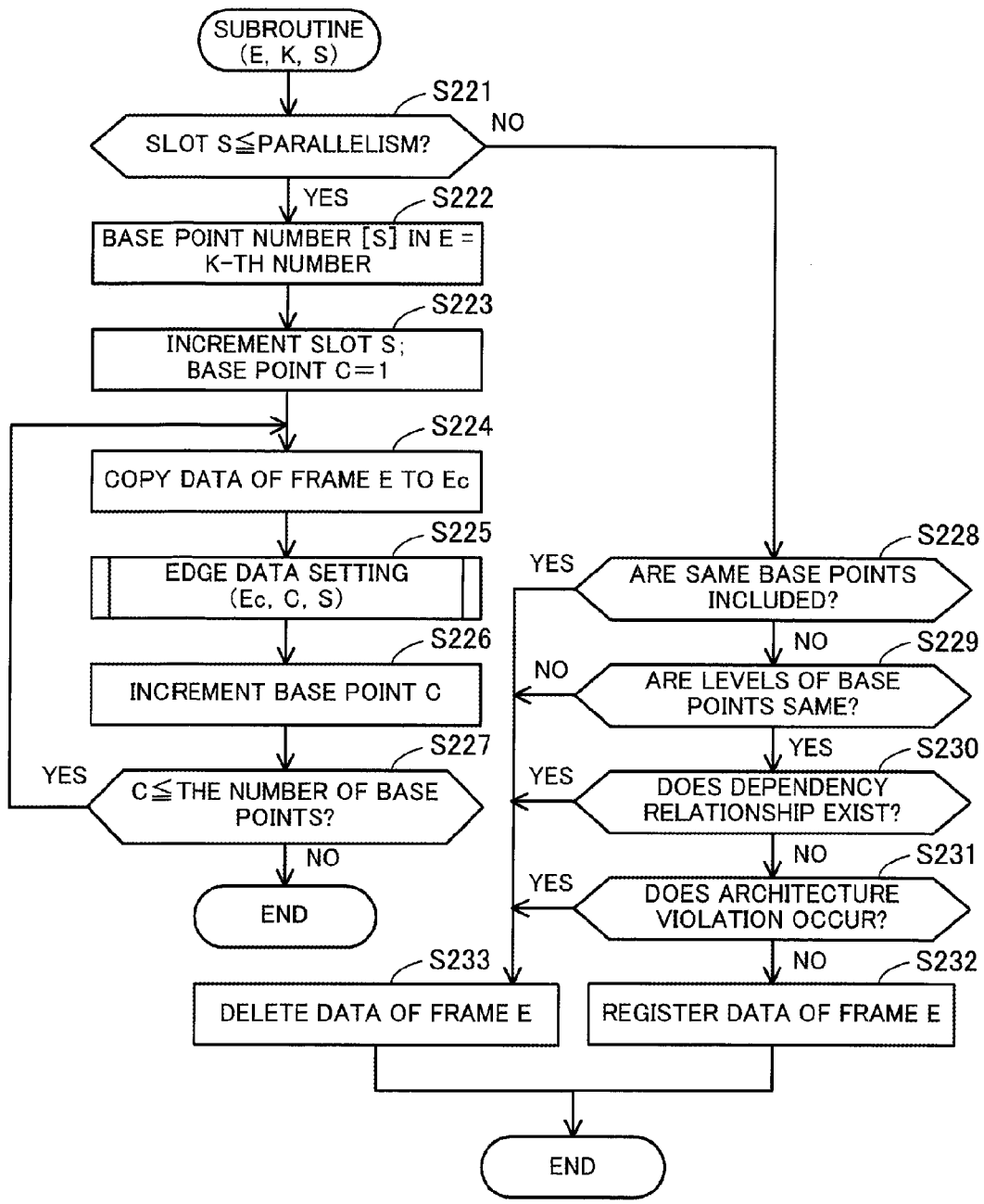
FIG. 25 is a flowchart illustrating an exemplary procedure of a subroutine for setting edge data.

FIG. 25 is a flowchart illustrating an exemplary procedure of a subroutine for setting edge data.

The subroutine of FIG. 25 receives, as parameters, a frame E, base point K, and slot S. This subroutine is called at the above-described step S213.

At step S221, the analysis unit 126 determines whether or not the value of the slot S is smaller than or equal to the SIMD parallelism, that is, whether or not the frame E still has any empty base number field. If there is any empty base point number field, the process proceeds to step S222. If all base point number fields are filled, the process proceeds to step S228. At step S222, the analysis unit 126 sets the instruction number of the K-th base instruction in the field for the base point number [S] in the frame E. At step S223, the analysis unit 126 increments the value of the slot S (add one to the value). The analysis unit 126 also defines a base point C as a variable, and initializes the base point C to one.

At step S224, the analysis unit 126 generates a copy of the frame E as a frame Ec. The base point numbers set in the frame E are also used in the frame Ec. At step S225, the analysis unit 126 gives the current frame Ec, base point C, and slot S as parameters to recursively call the subroutine of FIG. 25. At step S226, the analysis unit 126 increments the base point C. At step S227, the analysis unit 126 determines whether or not the value of the base point C is smaller than or equal to the total number of base instructions. If this condition is satisfied, the process proceeds to step S224. Otherwise, the subroutine is completed.

At step S228, the analysis unit 126 determines whether there are overlapping instruction numbers that are base point numbers in the frame E. If such overlapping instruction numbers are found, the process proceeds to step S233. Otherwise, the process proceeds to step S229. At step S229, the analysis unit 126 determines whether the levels of the base instructions indicated by the base point numbers included in the frame E are all the same or not. If these levels are the same, the process proceeds to step S230. Otherwise, the process proceeds to step S233. At step S230, the analysis unit 126 determines whether the plurality of dependency trees indicated by the frame E has a dependency relationship or not. If they have a dependency relationship, the process proceeds to step S233. Otherwise, the process proceeds to step S231.

At step S231, the analysis unit 126 determines whether combinations of instructions belonging to the plurality of dependency trees indicated by the frame E violate the processor architecture or not. Architecture violations may be that constrains on memory allocation are not satisfied, there is a data type (integer type, floating point number type, etc.) unacceptable for SIMD instructions, etc. If an architecture violation is found, the process proceeds to step S233. Otherwise, the process proceeds to step S232. At step S232, the analysis unit 126 registers the data of the frame E in the edge data 154, and completes the subroutine. At step S233, the analysis unit 126 deletes the data of the frame E, and then completes the subroutine.

Figure 26:
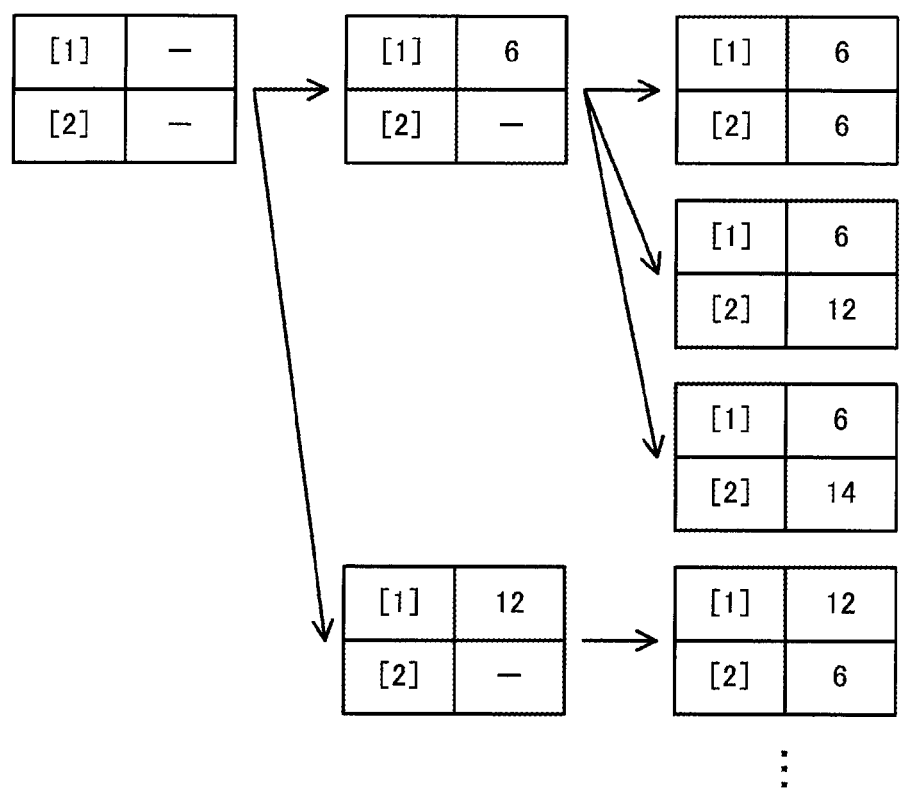
FIG. 26 illustrates an example of how to generate edge data.

FIG. 26 illustrates an example of how to generate edge data. By recursively executing the subroutine of FIG. 25, the instruction numbers of base instructions are set to the frame E one by one, in the order of base point number [1], base point number [2], . . . . Then, when all base point number fields are filled with data, it is determined whether to combine the plurality of dependency trees indicated by the frame E, and data on the plurality of dependency trees that are determined not to be combined is deleted. For example, data with the base point number [1] of 6 and the base point number [2] of 6 is deleted. In addition, it is determined whether the levels of a plurality of base instructions are all the same or not, and data on each combination of base instructions having different levels is deleted. If the level of the base instruction with the base point number of 6 and the level of the base instruction with the base point number of 14 are different, for example, data with the base point number [1] of 6 and the base point number [2] of 14 is deleted.

FIG. 27 illustrates an example of pack data candidates. The analysis unit 126 computes the power set of a plurality of edges as a set of packs, and evaluates each pack in terms of the number of instructions that are convertible to SIMD, in order to select one pack. When there are edges 1 and 2 independent of each other, a pack 1 employing only the edge 1, a pack 2 employing only the edge 2, and a pack 3 employing both the edges 1 and 2 are evaluated.

Figure 28:
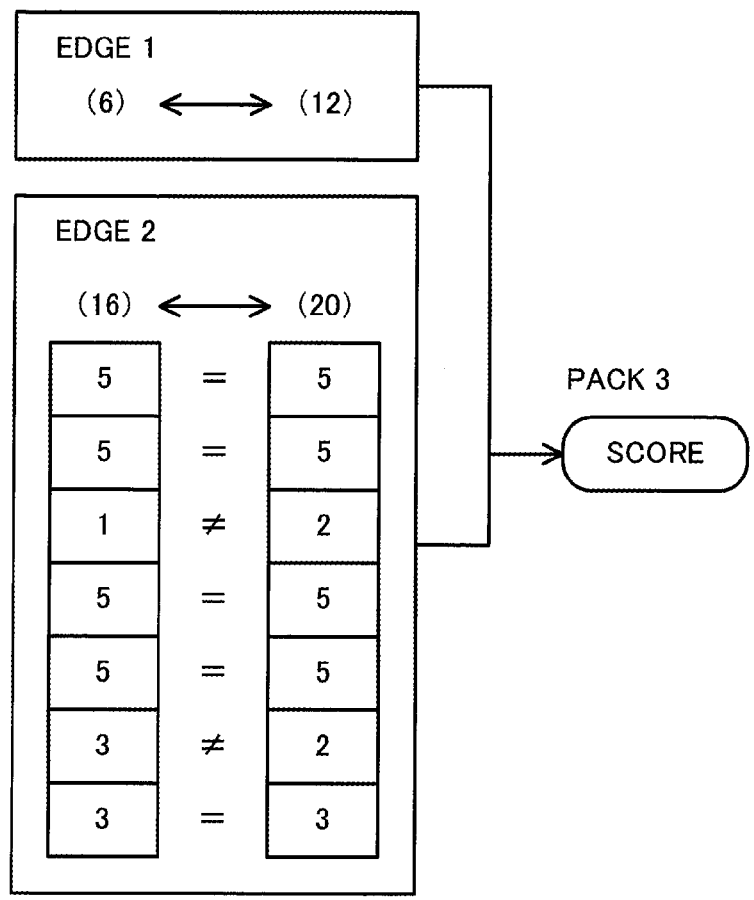
FIG. 28 illustrates an example of how to calculate a score from coded data.

FIG. 28 illustrates an example of how to calculate a score from coded data. To evaluate packs, the analysis unit 126 calculates the score of each pack. A pack with a higher score indicates that there are more instructions that are convertible to SIMD. The analysis unit 126 compares coded data among a plurality of dependency trees for each edge, and calculates, as the score of the edge, the number of combinations of instructions which exist in corresponding positions and specify the same operation type. Then, the analysis unit 126 adds up the scores of the edges and takes the result as the score of the pack.

Figure 29:
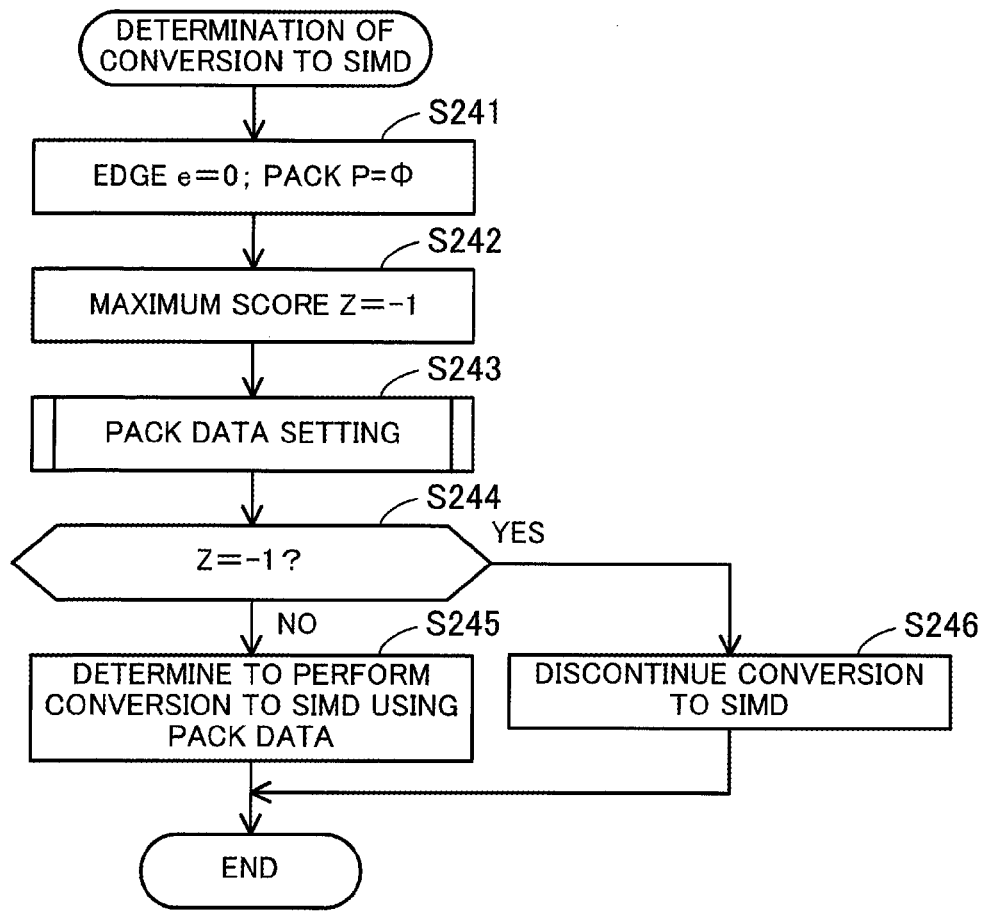
FIG. 29 is a flowchart illustrating an exemplary procedure for determining whether to perform conversion to SIMD.

FIG. 29 is a flowchart illustrating an exemplary procedure for determining whether to perform conversion to SIMD. The process described by the flowchart of FIG. 29 is performed at the above-described step S6.

At step S241, the analysis unit 126 defines an edge e and pack P as variables, and initializes the edge e to zero and pack P to zero Φ (empty set). At step S242, the analysis unit 126 defines a maximum score Z as a variable, and initializes the maximum score Z to −1. At step S243, the analysis unit 126 searches for a pack with the maximum score with a subroutine that will be described later.

At step S244, the analysis unit 126 determines whether the maximum score Z still has an initial value of −1 or not, i.e., whether no pack has been found or not. In the case where the maximum score Z has an initial value of −1, the process proceeds to step S246. Otherwise, the process proceeds to step S245. At step S245, the analysis unit 126 determines combinations of instructions to be converted to SIMD, from the back data 155. Instructions to be combined are instructions that exist in corresponding positions of a plurality of dependency trees included in the same edge. At step S246, the analysis unit 126 discontinues the conversion of instructions included in the current translation block of the intermediate code 141 to SIMD.

Figure 30:
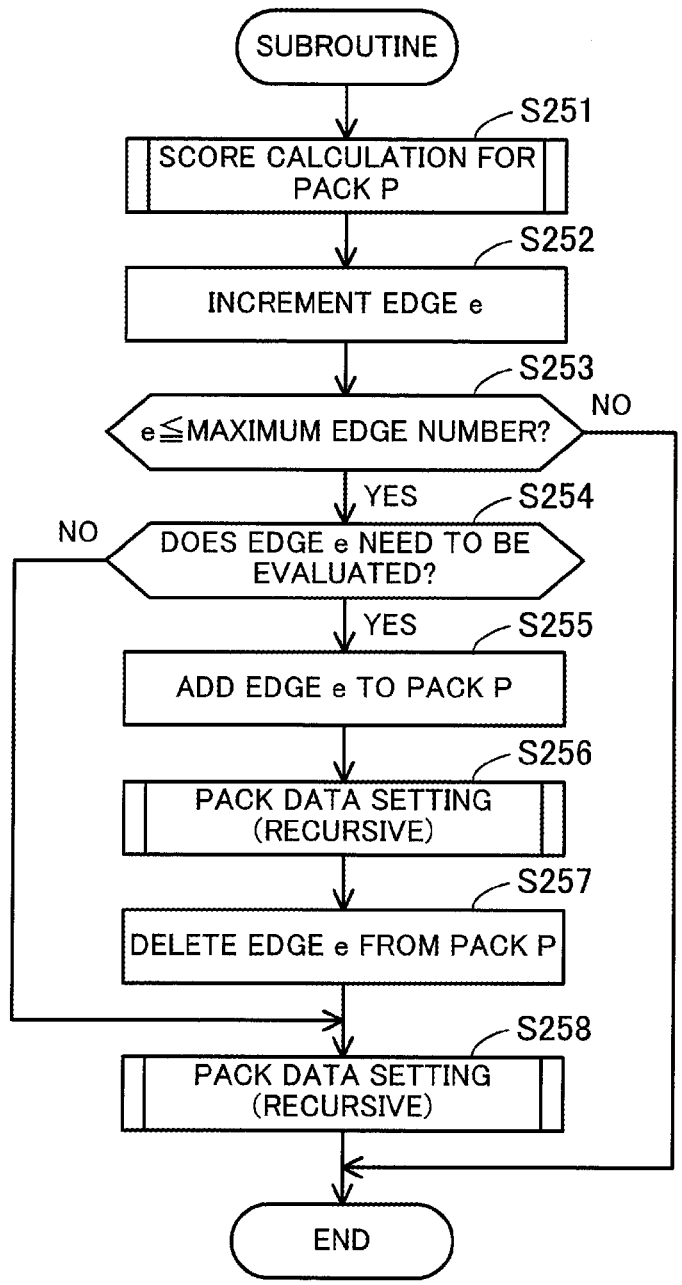
FIG. 30 is a flowchart illustrating an exemplary procedure of a subroutine for setting pack data.

FIG. 30 is a flowchart illustrating an exemplary procedure of a subroutine for setting pack data. The subroutine of FIG. 30 receives an edge e and pack P as parameters. This subroutine is called at the above-described step S243.

At step S251, the analysis unit 126 calculates the score of the pack P using the coded data with a method that will be described later. At step S252, the analysis unit 126 increments the edge e (add one to the value). At step S253, the analysis unit 126 determines whether the value of the edge e is smaller than or equal to the maximum edge number. If this condition is satisfied, the process proceeds to step S254. Otherwise, this subroutine is completed.

At step S254, the analysis unit 126 determines whether to evaluate a pack including an e-th edge (edge with an edge number of e). It is determined that the pack including the e-th edge does not need to be evaluated if any one of the following three conditions is satisfied. The first condition is that the dependency tree of the e-th edge is already included in the pack P. The second condition is that a dependency tree of the e-th edge has a dependency relationship with any of dependency trees already included in the pack P. The third condition is that the current score of the pack P is smaller by a predetermined value or greater than the maximum value of the calculated scores of the other packs, and so this pack would probably not be the best even if the e-th edge is added to the pack P. If the pack including the e-th edge needs to be evaluated, the process proceeds to step S255. Otherwise, the process proceeds to step S258.

At step S255, the analysis unit 126 adds the e-th edge to the pack P. At step S256, the analysis unit 126 gives the pack P including the e-th edge and the edge e as parameters to recursively call the subroutine of FIG. 30. At step S257, the analysis unit 126 deletes the e-th edge added at step S255 from the pack P. At step S258, the analysis unit 126 gives the pack P which does not include the e-th edge, and the edge e as parameters to recursively call the subroutine of FIG. 30.

Figure 31:
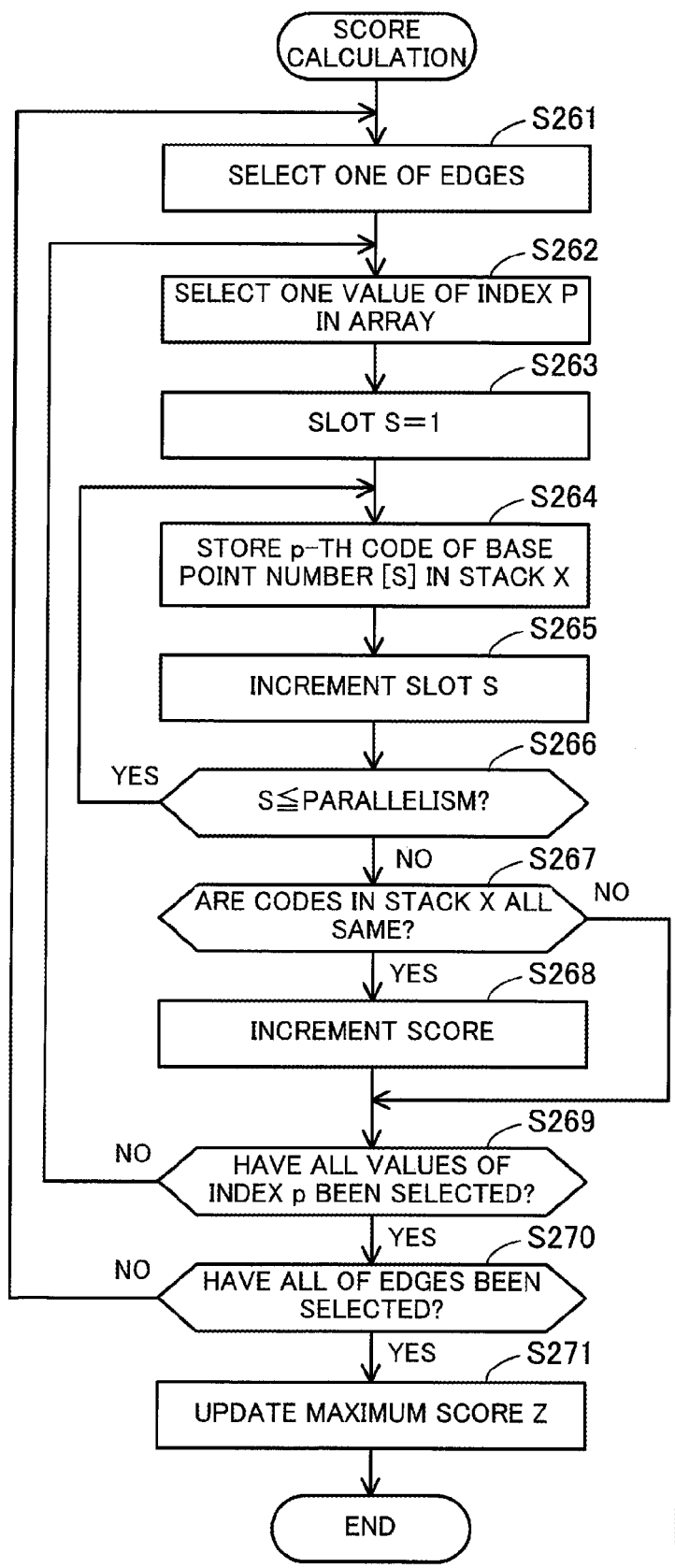
FIG. 31 is a flowchart illustrating an exemplary procedure for score calculation.

FIG. 31 is a flowchart illustrating an exemplary procedure for score calculation. The process described by the flowchart of FIG. 31 is performed at the above-described step S251.

At step S261, the analysis unit 126 selects one of the edges included in a pack. At step S262, the analysis unit 126 selects one value of index p for specifying a code included in an array. The value of the index p varies from one up to a value indicating the length of the longest array out of a plurality of arrays corresponding to the plurality of dependency trees belonging to the edge. At step S263, the analysis unit 126 defines a slot S as a variable, and initializes the slot S to one.

At step S264, the analysis unit 126 selects a dependency tree corresponding to the base point number [S] of the edge selected at step S261, and acquires the array that is the coded data of the dependency tree. The analysis unit 126 then stores the p-th code included in the acquired array in a stack X that is a storage area reserved in the RAM 102. In this connection, when the length of the acquired array is smaller than p, a predetermined code (for example, "0") indicating that there is no instruction is stored in the stack X. At step S265, the analysis unit 126 increments the slot S (add one to the value). At step S266, the analysis unit 126 determines whether or not the value of the slot S is smaller than or equal to the SIMD parallelism. If the value of the slot S is smaller than or equal to the parallelism, the process goes back to S264. Otherwise, the process proceeds to step S267.

At step S267, the analysis unit 126 determines whether the codes stored in the stack X are all the same or not. That is, it is determined whether instructions existing in corresponding positions specify the same operation type or not. If they are the same, the process proceeds to step S268. Otherwise, the process proceeds to step S269. At step S268, the analysis unit 126 increments the score of the pack.

At step S269, the analysis unit 126 determines whether all of the values of the index p have been selected at step S262 or not. If all of the values have been selected, the process proceeds to step S270. If there is any unselected value, the process goes back to step S262. At step S270, the analysis unit 126 determines whether all of the edges have been selected at step S261 or not. If all of the edges have been selected, the process proceeds to step S271. If there is any unselected edge, the process goes back to step S261. At step S271, the analysis unit 126 determines whether the score of the pack obtained at step S268 is greater than the currently maximum score Z or not. If the score is greater than the maximum score Z, the analysis unit 126 updates the maximum score Z to the calculated score.

Figure 32:
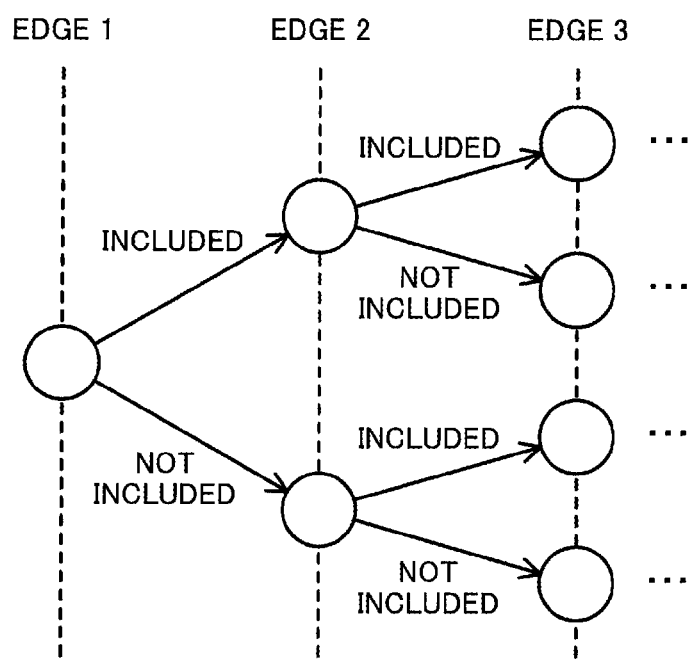
FIG. 32 illustrates an example of how to generate pack data.

FIG. 32 illustrates an example of how to generate pack data. By recursively calling the subroutine of FIG. 30, the process of evaluating a score is split into a process to be performed when the e-th edge is included in the pack P and a process to be performed when the e-th edge is not included in the pack P. First, the process is split into two according to whether the first edge is included in the pack P or not. Then, each of the two processes is split into two, according to whether the second edge is included in the pack P or not, which means that the original process is split into four in total. The process is split according to the number of edges thereafter.

The terminal device 100 according to the second embodiment deforms a plurality of dependency trees representing a dependency relationship among the instructions included in the intermediate code 141 through height adjustment, operation order shuffling, etc., which increases a possibility that the plurality of dependency trees have the same shape and instructions that specify the same operation type exist in corresponding positions of the dependency trees. Therefore, by comparing instructions existing in corresponding positions among the deformed dependency trees, combinations of instructions that are convertible to SIMD are found, thus making it possible to efficiently search for combinations of instructions that are convertible to SIMD.

As described earlier, the information processing of the first embodiment is realized by causing the information processing apparatus 10 to execute an intended program. The information processing of the second embodiment is realized by causing the terminal device 100 to execute an intended program. The program may be recorded on a computer-readable recording medium (for example, recording medium 23). Recording media include magnetic disks, optical discs, magneto-optical discs, semiconductor memories, etc. The magnetic disks include FDs and HDDs. The optical discs include CDs, CD-R (Recordable)/RW (Rewritable), DVDs, and DVD-R/RW.

To distribute a program, portable recording media, on which the program is recorded, may be provided. Alternatively, the program may be stored in the storage device of another computer and may be transferred from the computer through a network. A computer stores in its local storage device (for example, HDD 103) the program recorded on a portable recording medium or transferred from the other computer, for example, and then executes the program. The computer may run the program directly from the portable recording medium. Also, while receiving the program being transferred from the other computer through the network, the computer may sequentially run this program.

According to one aspect, it is possible to efficiently search for a combination of instructions for generating a specific instruction that performs the same type of operation on different data in parallel.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable storage medium storing a computer program for generating, from a first code, a specific instruction that performs a same type of operation on different data in parallel by combining two or more instructions included in the first code, and generating a second code including the specific instruction, the computer program causing a computer to perform a procedure comprising:
- generating first and second trees representing a dependency relationship among instructions from the first code, the second tree being shorter in height than the first tree;
- deforming the first and second trees with first and second deformations, the first deformation equalizing the first and second trees in height by inserting pseudo instructions to the second tree that is shorter than the first tree, the pseudo instructions causing no difference in data before and after operation, the second deformation sorting instructions existing at a same depth from a root according to operation types specified by the instructions in one or both of the first and second trees; and
- comparing the first and second trees subjected to the adjusting of the height and the sorting of instructions with each other to determine combinations of an instruction of the first tree and an instruction of the second tree, wherein the first deformation includes:
- inserting the pseudo instructions to the second tree as a trial;
- calculating a single-instruction multiple-data (SIMD) ratio representing a ratio of instructions to be converted to SIMD instructions to all the instructions included in the second tree;
- repeating the inserting the pseudo instructions as a trial and the calculating a SIMD ratio for each different combination of positions in the second tree at which the pseudo instructions can be inserted;
- selecting one of the combinations of positions for the pseudo instructions with which the calculating yields a greatest SIMD ratio; and
- inserting the pseudo instructions to the selected combination of positions in the second tree.

2. The non-transitory computer-readable storage medium according to claim 1, wherein, when a plurality of load instructions exist at a same depth from the root in one or both of the first and second trees, the sorting includes sorting the plurality of load instructions according to variable names identifying data to be loaded by the load instructions.

3. The non-transitory computer-readable storage medium according to claim 1, wherein the sorting includes sorting instructions existing at a same depth from the root according to operation types in each of the first and second trees.

4. A code generation method for generating, from a first code, a specific instruction that performs a same type of operation on different data in parallel by combining two or more instructions included in the first code, and generating a second code including the specific instruction, the code generation method comprising:
- generating first and second trees representing a dependency relationship among instructions from the first code, the second tree being shorter in height than the first tree;
- deforming the first and second trees with first and second deformations, the first deformation equalizing the first and second trees in height by inserting pseudo instructions to the second tree that is shorter than the first tree, the pseudo instructions causing no difference in data before and after operation, the second deformation sorting instructions existing at a same depth from a root according to operation types specified by the instructions in one or both of the first and second trees; and
- comparing the first and second trees subjected to the adjusting of the height and the sorting of instructions with each other to determine combinations of an instruction of the first tree and an instruction of the second tree, wherein the first deformation includes:
- inserting the pseudo instructions to the second tree as a trial;
- calculating a single-instruction multiple-data (SIMD) ratio representing a ratio of instructions to be converted to SIMD instructions to all the instructions included in the second tree;
- repeating the inserting the pseudo instructions as a trial and the calculating a SIMD ratio for each different combination of positions in the second tree at which the pseudo instructions can be inserted;
- selecting one of the combinations of positions for the pseudo instructions with which the calculating yields a greatest SIMD ratio; and
- inserting the pseudo instructions to the selected combination of positions in the second tree.

5. An information processing apparatus comprising:
- a storage unit configured to store a first code, and a second code including a specific instruction that performs a same type of operation on different data in parallel; and
- a processor configured to generate the specific instruction by combining two or more instructions included in the first code, in order to generate the second code from the first code, wherein the processor performs a procedure including:
- generating first and second trees representing a dependency relationship among instructions from the first code, the second tree being shorter in height than the first tree;
- deforming the first and second trees with first and second deformations, the first deformation equalizing the first and second trees in height by inserting pseudo instructions to the second tree that is shorter than the first tree, the pseudo instructions causing no difference in data before and after operation, the second deformation sorting instructions existing at a same depth from a root according to operation types specified by the instructions in one or both of the first and second trees; and
- comparing the first and second trees subjected to the adjusting of the height and the sorting of instructions with each other to determine combinations of an instruction of the first tree and an instruction of the second tree, and wherein the first deformation includes:
- inserting the pseudo instructions to the second tree as a trial;
- calculating a single-instruction multiple-data (SIMD) ratio representing a ratio of instructions to be converted to SIMD instructions to all the instructions included in the second tree;
- repeating the inserting the pseudo instructions as a trial and the calculating a SIMD ratio for each different combination of positions in the second tree at which the pseudo instructions can be inserted;
- selecting one of the combinations of positions for the pseudo instructions with which the calculating yields a greatest SIMD ratio; and
- inserting the pseudo instructions to the selected combination of positions in the second tree.

* * * * *